US006948906B2

(12) United States Patent
Leishman et al.

(10) Patent No.: US 6,948,906 B2
(45) Date of Patent: Sep. 27, 2005

(54) ROTOR BLADE SYSTEM WITH REDUCED BLADE-VORTEX INTERACTION NOISE

(75) Inventors: John G. Leishman, Gaithersburg, MD (US); Yong Oun Han, Sandy Spring, MD (US)

(73) Assignee: University of Maryland, College Park, MD (US)

( * ) Notice: Subject to any disclaimer, the term of this patent is extended or adjusted under 35 U.S.C. 154(b) by 94 days.

(21) Appl. No.: 10/618,645

(22) Filed: Jul. 15, 2003

(65) Prior Publication Data

US 2004/0197194 A1 Oct. 7, 2004

Related U.S. Application Data

(60) Provisional application No. 60/459,722, filed on Apr. 2, 2003.

(51) Int. Cl.[7] .............................................. F04D 29/66
(52) U.S. Cl. ..................... 415/119; 415/914; 416/90 R; 416/90 A; 416/91
(58) Field of Search ................................ 415/119, 914; 416/90 R, 90 A, 91, 92, 231 R

(56) References Cited

U.S. PATENT DOCUMENTS

| | | | | | |
|---|---|---|---|---|---|
| 3,692,259 | A | * | 9/1972 | Yuan ......................... | 416/90 A |
| 3,936,013 | A | * | 2/1976 | Yuan ......................... | 416/90 A |
| 4,045,146 | A | * | 8/1977 | Crimi ............................ | 416/1 |
| 4,655,685 | A | | 4/1987 | Fradenburgh | |
| 5,562,414 | A | * | 10/1996 | Azuma ...................... | 416/90 A |
| 5,791,875 | A | | 8/1998 | Ngo | |
| 6,203,269 | B1 | * | 3/2001 | Lorber et al. ................ | 415/119 |
| 6,283,406 | B1 | | 9/2001 | Remington et al. | |
| 6,295,006 | B1 | | 9/2001 | Kohlhepp | |

FOREIGN PATENT DOCUMENTS

| | | | | |
|---|---|---|---|---|
| JP | 06199295 A | * | 7/1994 | ........... B64C/27/18 |

OTHER PUBLICATIONS

Leishman, J.G., and Bagai, A., "Challenges in Understanding the Vortex Dynamics of Helicopter Rotor Wakes," A/AA Journal, vol. 36, No. 7, Jul. 1998, pp. 1130–1140.
Leishman, J.G., Principles of Helicopter Aerodynamics, Cambridge University Press, 2000, Chapter 10.
Schmitz, F.H., "Rotor Noise," Chapter 2, Aeroacoustics of Flight Vehicles: Theory and Practice, vol. 1, NASA Reference Publication 1258, Aug. 1991.
Berry, J.D., and Mineck, R.E., "Wind Tunnel Test for an Articulated Helicopter Rotor Model with Several Tip Shapes," NASA–TM–80080, Dec., 1980.
Martin, P.B. and Leishman, J.G., "Trailing Vortex Measurements in the Wake of a Hovering Rotor Blade with Various Tip Shapes," Proceedings of the 58th Annual Forum of the.
Tangler, J.L., "Experimental Investigation of the Sub–wing Tip and Its Vortex Structure," NASA CR–3058, 1978.
Marchman, J.F. III, and Uzel, J.N., "Effect of Several Wing Tip Modifications on a Trailing Vortex" Journal of Aircraft, vol. 9, No. 9, 1972, pp. 684–686.
McAlister, K.W., Tung, C., and Heineck, J.T., "Devices that Alter the Tip Vortex of a Rotor," NASA/TM–2001–209625 (AFDD/TR–01–A–003), 2001.

(Continued)

Primary Examiner—Edward K. Look
Assistant Examiner—Igor Kershteyn
(74) Attorney, Agent, or Firm—Rosenberg, Klein & Lee

(57) ABSTRACT

A rotor blade system with reduced blade-vortex interaction noise includes a plurality of tube members embedded in proximity to a tip of each rotor blade. The inlets of the tube members are arrayed at the leading edge of the blade slightly above the chord plane, while the outlets are arrayed at the blade tip face. Such a design rapidly diffuses the vorticity contained within the concentrated tip vortex because of enhanced flow mixing in the inner core, which prevents the development of a laminar core region.

8 Claims, 23 Drawing Sheets

OTHER PUBLICATIONS

Kantha, H.L., Lewellen, W.S., and Durgin, F.H., "Response of a Trailing Vortex to Axial Injection into the Core," Journal of Aircraft, vol. 9, No. 3, 1972, pp. 254–256.

Liu, Z., Russel, J.W. and Sankar, L.N., "A study of Rotor Tip Structure Alteration Technique," Journal of Aircraft, vol. 38, No. 3, 2001, pp. 473–477.

Han, Y.O., and Bae, H., "Modification of the Tip Vortex by Span-wise Slots," KSAS Korean Journal, vol. 27, No. 5, 1998, pp. 1–7.

Han, Y.O., and Chung, W.J., "Mean and Turbulent Characteristics of Tip Vortices Generated by a Slotted Model Blade," Proceedings of 5th Engineering Turbulence Modeling.

Martin, P.B., Bhagwat, M.J., and Leishman, J.G., "Strobed Laser-Sheet Visualization of a Helicopter Rotor Wake," 2nd Pacific Symposium on Flow Visualization and Image Pro.

Bhagwat, M.J., and Leishman, J.G., "Stability Analysis of Rotor Wakes in Axial Flight," Journal of the American Helicoptor Society, vol. 45, No. 3, 2000, pp. 165–178.

Leishman, J.G., "Seed Particle Dynamics in Tip Vortex Flow," Journal of Aircraft, vol. 33, No. 4, 1996, pp. 823–825.

Martin, P.B., Pugliese, G.J., and Leishman, J.G., "Laser Doppler Velocimetry Uncertainty Analysis For Rotor Blade Tip Vortex Measurements," AIAA CP 2000–0263, 38th Ae.

Barrett, R.V., and Swales, C., "Realisation of the Full Potential of the Laser Doppler Anemometer in the Analysis of Complex Flows," Aeronautical Journal, vol. 102, No. 1.

Tung, C., Caradonna, F.X., and Morse, H.A., "The Structure of Trailing Vortices Generated by Model Rotor Blades," Vertica, vol. 7, 1983, pp. 33–43.

Tennekes, H, and Lumley, J.L., A First Course in Turbulence, MIT Press, 1972.

Vatistas, G.H., Kozel, V., and Mih, W.C., "Simpler Model for Concentrated Vorticies," Experiments in Fluids, vol. 24, No. 11, 1991, pp. 73–76.

Lamb, H., Hydrodynamics, 6th Ed. Cambridge University Press, Cambridge, UK 1932.

Oseen, C.W., "Uber Wirbelbewegung in Einer Reiben den Flussigkeit," Ark. J. Mat. Astrom. Fys., vol. 7, 1912, pp. 14–21.

Bhagwat, M.J., and Leishman, J.G., "Viscous Vortex Core Models for Free-Vortex Wake Calculations," Proceedings of the 58th Annual Forum of the American Helicopter Societ.

Bhagwat, M.J., and Leishman, J.G., "Correlation of Helicopter Rotor Tip Vortex Measurements," AIAA Journal, vol. 38, No. 2, 2000, pp. 301–308.

Squire, H.B., "The Growth of a Vortex in Turbulent Flow," The Aeronautical Quarterly, Aug. 1965, pp. 302–305.

Cotel, A.J., and Breidenthal, R.E., "Turbulence Inside a Vortex," Physics of Fluids, vol. 11, No. 10, 1999, pp. 3026–3029.

Bradshaw, P., "The analogy Between Streamline Curvature and Bouyancy in Turbulent Shear Flows," Journal of Fluid Mechanics, vol. 36, Part 1, pp. 177–191.

Iverson, J.D., "Correlation of Turbulent Trailing Vortex Decay Data," Journal of Aircraft, vol. 13, No. 3, 1976, pp. 338–342.

Devenport, W.J., Rife, M.C., Liapis, S.I., and Follin, G.J., "The Structure and Development of a Wing-Tip Vortex," Journal of Fluid Mechanics, vol. 312, 1996, pp. 67–106.

Leishman, J.G., "Measurements of the Aperiodic Wake of a hovering Rotor," Experiments in Fluids, vol. 25, 1998, pp. 352–361.

Gursul, I., and Xie, W., "Origin of Vortex Wandering Over Delta Wings," Journal of Aircraft, vol. 37, No. 2, 1999, pp. 348–350.

* cited by examiner

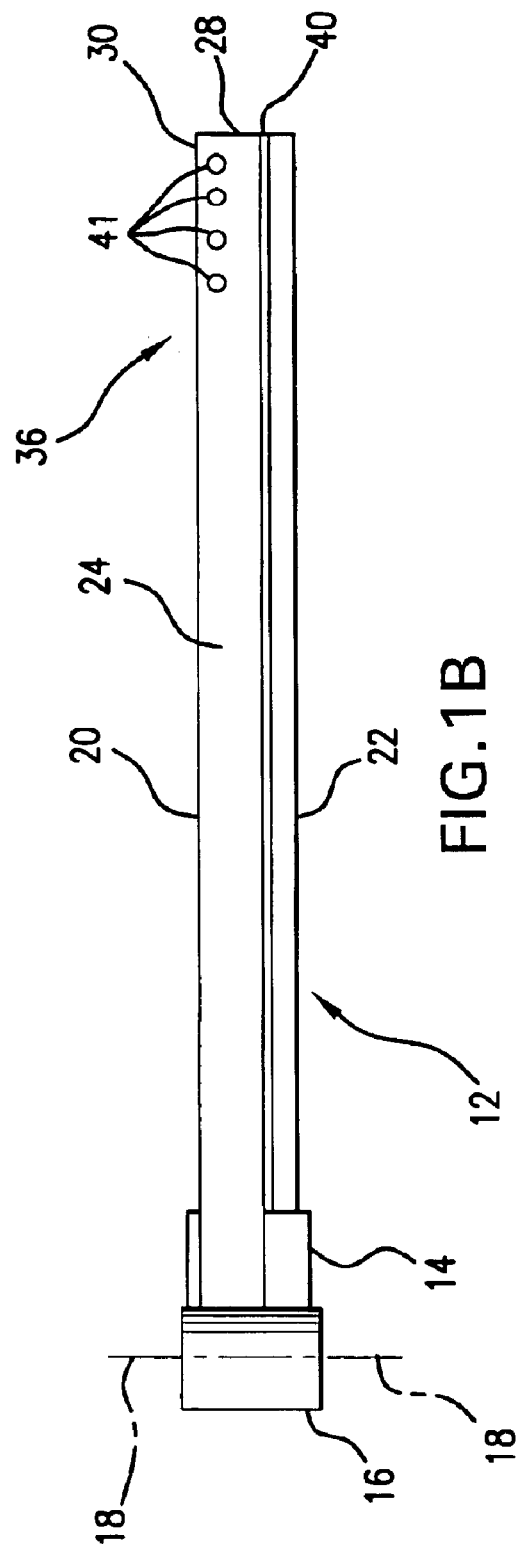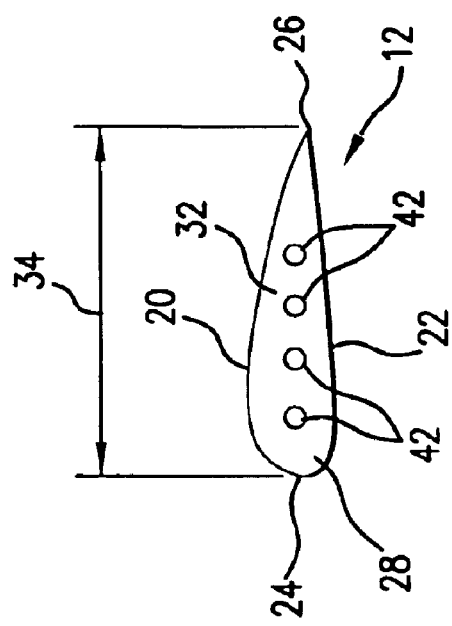

Wake age = 15 & 375 degrees

Wake age = 60 degrees

Wake age = 90 degrees

Wake age = 145 degrees

Wake age = 180 degrees

Wake age = 270 degrees

Wake age = 15 & 375 degrees

Wake age = 60 degrees

Wake age = 90 degrees

Wake age = 145 degrees

Wake age = 180 degrees

Wake age = 270 degrees

View at leading edge of slotted blade

View normal to rotor tip-path-plane

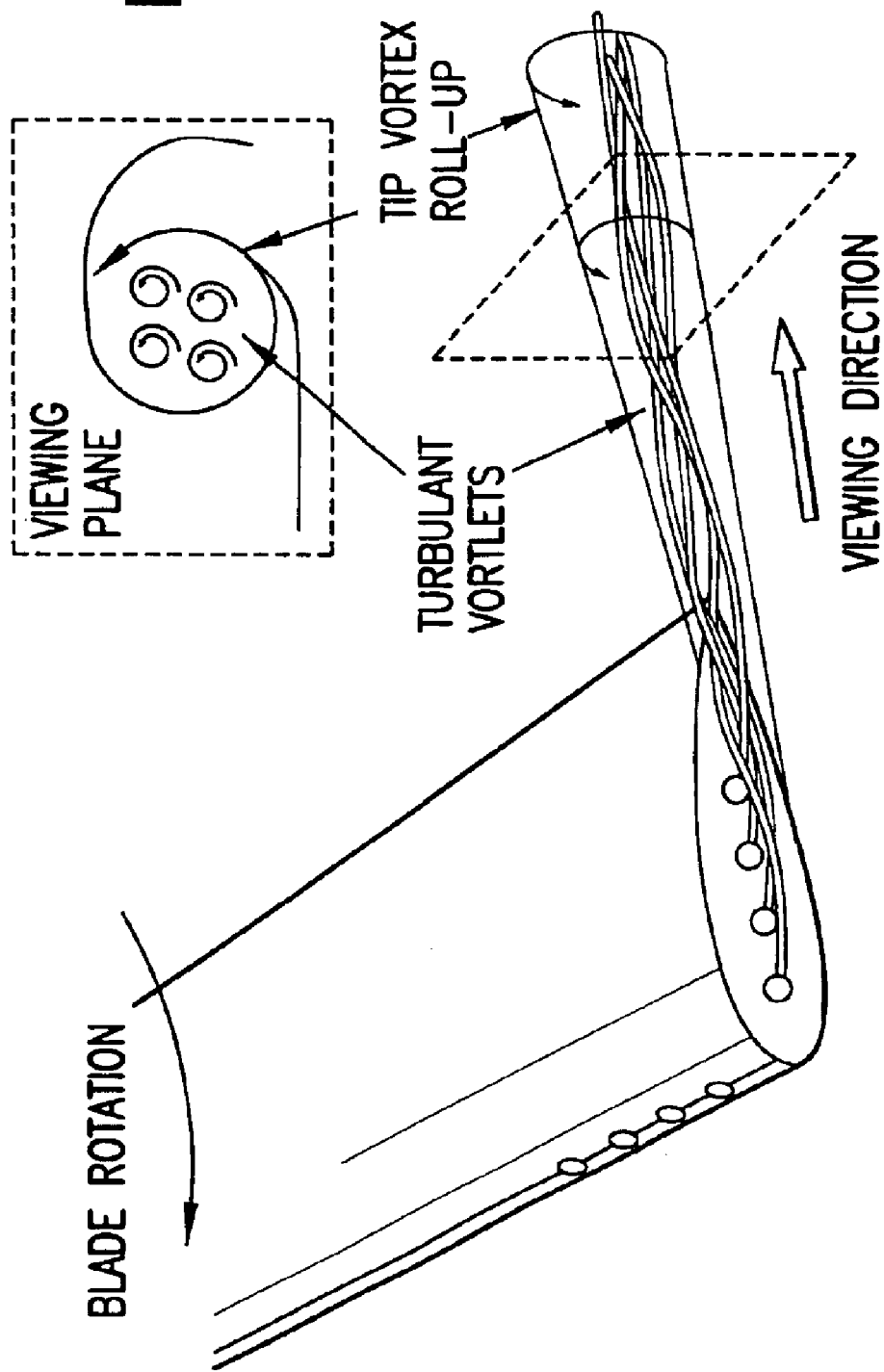

Wake age = 60 degrees
Baseline Tip <span></span> Slotted Tip
 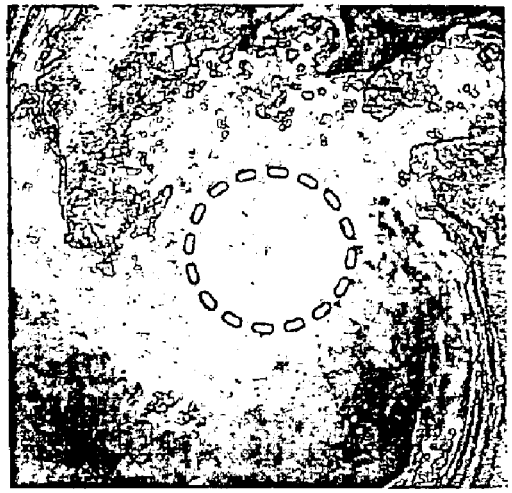
FIG.11A
Wake age = 145 degrees
Baseline Tip <span></span> Slotted Tip
 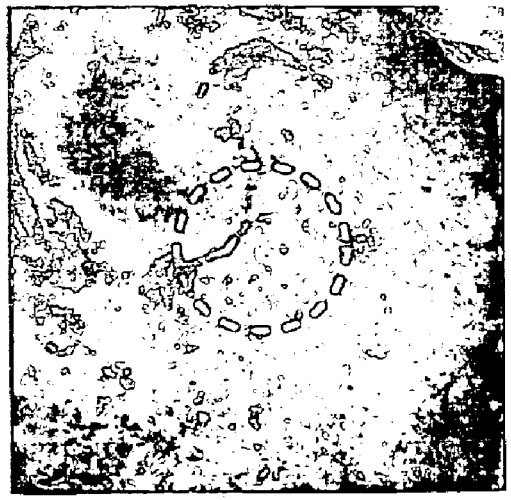
FIG.11B Wake age = 180 degrees
Baseline Tip 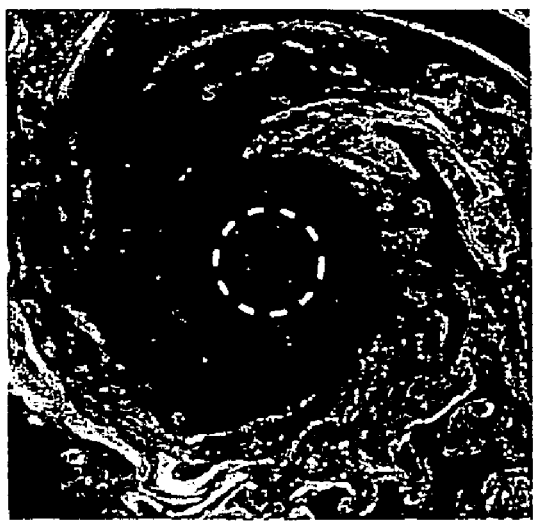 Slotted Tip 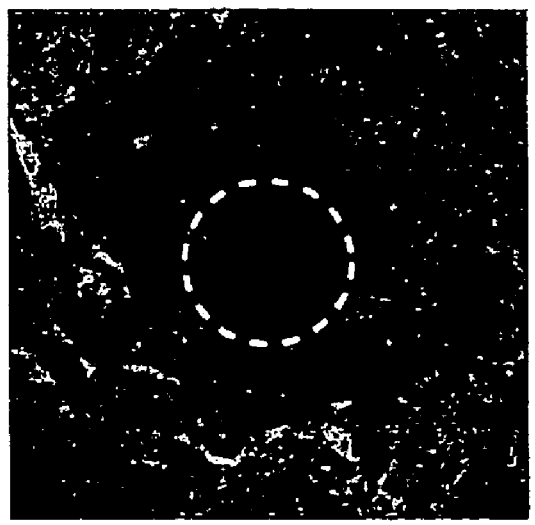
FIG.11C

ROTOR BLADE SYSTEM WITH REDUCED BLADE-VORTEX INTERACTION NOISE

REFERENCE TO RELATED APPLICATION

The current Utility Patent Application is based on Provisional Patent Application Ser. No. 60/459,722 filed 2 Apr. 2003.

This invention was made with Government support under Contract No. NGT252273 awarded by NASA. The Government has certain rights in the invention.

FIELD OF THE INVENTION

The present invention relates to the reduction of blade-vortex interaction (BVI) noise caused by the movement of aircraft rotor blades, such as those found in, for example, helicopters.

More particularly, the present invention relates to a rotor blade system with reduced blade-vortex interaction noise which is attained by slotting the tip portion of rotor blades. This allows a fraction of the incident flow to pass from the leading edge of the rotor blade through the channels at the tip portion thereof to be ejected out of the rotor blade tip face. The change between the incident and outgoing flow results in detachment of the tip vortex from the rotor blade tip, as well as in introduction of turbulent vortlets into the laminar core of a developing vortex, thus reducing the blade vortex interaction noise in the rotor blade system.

In overall concept, the present invention is directed to a method of reducing the blade-vortex interaction noise in rotor blade systems by embedding a plurality of tube members into the rotor blades in proximity to the blade tip. A plurality of inlets arrayed on the leading edge of the rotor blade and a plurality of outlets are arrayed on the tip face of the blade in order to modify the characteristics of the vortex trailed from the blade tip.

BACKGROUND OF THE INVENTION

Considerable research has been conducted in the field of measuring and understanding the development of blade tip Vortices trailed into the wakes of rotors. The research and resulting studies have been motivated by the fact that the structure of the tip vortices defines the majority of the induced velocity field surrounding the rotorcraft. The strong, concentrated tip vortices generated by a helicopter rotor blade (or by the proprotors on a tilt rotor) can also be a source of adverse aerodynamic problems, such as blade-vortex interactions (BVI) and vortex-airframe interactions. In each case, it is the high induced velocities surrounding the tip vortices that become a source of unsteady aerodynamic forces, which can be a significant source of rotor noise and airframe vibrations.

In particular, it is known that small changes in the structure of the tip vortices and their positions relative to the rotor blades can have substantial effects on BVI noise. The reduction of rotor noise has become an important goal in the design of new rotorcraft for both military and civil uses.

In principle, it is plausible to modify the structure of the tip vortices by diffusing their concentrated vorticity which can significantly reduce or even eliminate the aforementioned adverse aerodynamic problems. However, the goal of producing the rapid and effective diffusion of vorticity inside tip vortices is not a new approach nor is it an easy one to implement. Various approaches have been considered, such as with the use of various types of tip shape modifications including sub-wings or spoilers. Active flow control and passive flow control have also been suggested for this purpose.

U.S. Pat. No. 6,283,406 relates to the reduction of noise caused by the movement of aircraft rotor blades whereby the rotor blade system includes a number of jets at different locations and orientations at the tip of each blade through which flow is adjusted. In this approach, the tip vortices are spread out and decay rapidly with increasing distance from the blade tip. The decay and spreading out of the vortices reduce the generation of BVI noise when the vortices encounter the following blade. Such an approach recognizes that the jet orientation and flow velocity needed to reduce BVI noise depends on helicopter operating conditions. Consequently, the system provides for adjustment of the jet orientation and flow velocity based on the observed BVI noise reduction.

A computer on board the helicopter monitors the change in BVI noise using one or both of the noise reduction performance monitoring sensors (microphones and/or pressure sensors) and selects jet location and orientation (i.e., turn on a particular jet) and flow rate so as to reduce BVI noise. BVI noise is additionally reduced by providing blade tip air flow injection in which a plurality of air openings are formed in the outboard tip of the rotor blade and in the surface of the rotor blade proximate the tip for expelling pressurized air. In this technique the system of monitored sensors, as well as an additional source of pressurized air for jet flow injection (for example, an air pump) are employed which greatly complicates the electronic and mechanical structures of the system.

The above techniques basically act to modify the tip vortex structure in some way or perhaps change its stability characteristics. However, the reduction of the induced velocity field surrounding the tip vortex has been found difficult to accomplish without incurring some other form of rotor performance penalty which usually appears as an increase in profile power at the rotor. Actively controlled devices also require some power to establish the blowing/suction or unsteady excitation of the boundary layers at the blade tip and further requires additional non-structural mass for the flow control mechanisms.

Therefore, a technique using some form of simple, lightweight, low-cost passive flow control device which incurs little or no adverse effects on overall rotor performance is still needed in the art.

SUMMARY OF THE INVENTION

It is an object of the present invention to provide a rotor blade system with reduced aircraft rotor noise and noise caused by blade-vortex interaction.

It is another object of the present invention to provide a rotor blade system capable of highly effective diffusing vorticity and reducing the flow high field velocity that would otherwise be induced by a rotor tip vortex.

It is a further object of the present invention to provide a rotor blade system with embedded flow channels inside the tip region where the inlets are arrayed at the leading edge of the rotor blade and the outlets are arrayed on the blade tip face in order to reduce the tip vortex outward from the core of the tip vortex in rapid fashion.

It is another object of the present invention to provide a rotor blade system capable of highly effective diffusing vorticity and reducing the flow high field velocity that would otherwise be induced by a rotor tip vortex.

It is still an object of the present invention to optimize the location of the flow channels by moving the tube array to the position above the chord plane.

According to the teaching of the present invention, the rotor blade system with reduced blade-vortex interaction noise is provided which includes a plurality of rotor blades coupled at one end to a central hub to create rotational motion thereabout. Each rotor blade is provided with a plurality of channels which are implemented as tube members embedded in the blade in proximity to the blade tip. The inlets of the tube members are arrayed on the leading edge of the blade, while outlets of the tube members are located at the rotor blade tip face. The length of each arcuately shaped tube member extends within the interior volume of the rotor blade defined between the upper and lower surfaces thereof.

The parameters of the blade rotor system are optimized in a manner where the inlet array on the leading edge of the blade is located above the chord plane of the rotor blade. Further optimization includes the precise dimensioning of the diameter of the tubes and distance between inlets as well as outlets.

The system of the flow channels formed by the tube members generates a pressure gradient between the inlets and respective outlets of the tube members. A small amount of the incident flow is directed from the leading edge through the tube members to be ejected from the rotor blade tip face. This results in detaching the tip vortex from the rotor blade tip face and introducing turbulent vortlets into the laminar core of a developing vortex for dissolving the core region which reduces blade-vortex interaction noise.

The present invention further represents a method of reducing blade vortex interaction noise in a rotor blade system of, for example, helicopter, which includes the steps of:

coupling a plurality of rotor blades to a central hub, embedding a plurality of tube members into each rotor blade in proximity to the blade tip, where each tube member has an inlet positioned at the leading edge portion of the rotor blade, an outlet positioned at the rotor blade tip face, and a tube member length extending in arcuate fashion between the inlet and outlet within the interior volume of the rotor blade defined between the upper and lower surfaces thereof; and generating a rotational motion of the rotor blade system so that a portion of the flow incident onto the leading edge of the rotor blade passes through the tube members and is sequentially ejected out of the rotor blade tip face through the outlets of the tube members resulting in reducing blade-vortex interaction noise.

These and other novel features and advantages of this invention will be fully understood from the following detailed description of the accompanying Drawings.

BRIEF DESCRIPTION OF THE DRAWINGS

FIG. 1A and FIG. 1B show schematically a plan-form view and a leading edge view of the rotor blade, respectively;

FIG. 2 shows schematically a blade tip face of the rotor blade of the present invention;

FIGS. 6A and 6B show respectively a detailed flow visualization of the region near the tip of the slotted blade of the present invention, wherein FIG. 6A is a view at the leading edge normal to the tip path plane, and FIG. 6B is a view perpendicular to the tip path plane (flow moves left to right);

FIGS. 7A and 7B show schematically the process of dissolving the laminar core region by the action of turbulent vortlets generated at the tube member outlets at the blade tip face;

FIGS. 11A–11C show in comparative fashion the tip vortex cores for baseline blade and the blade with the slotted tip of the present invention at wake ages=60°, 150°, and 180°, respectively, with the measured core sizes at comparable wake ages for both blades (measured core sizes are shown by the dashed circles);

DETAILED DESCRIPTION OF THE PREFERRED EMBODIMENT

Figure 1A:
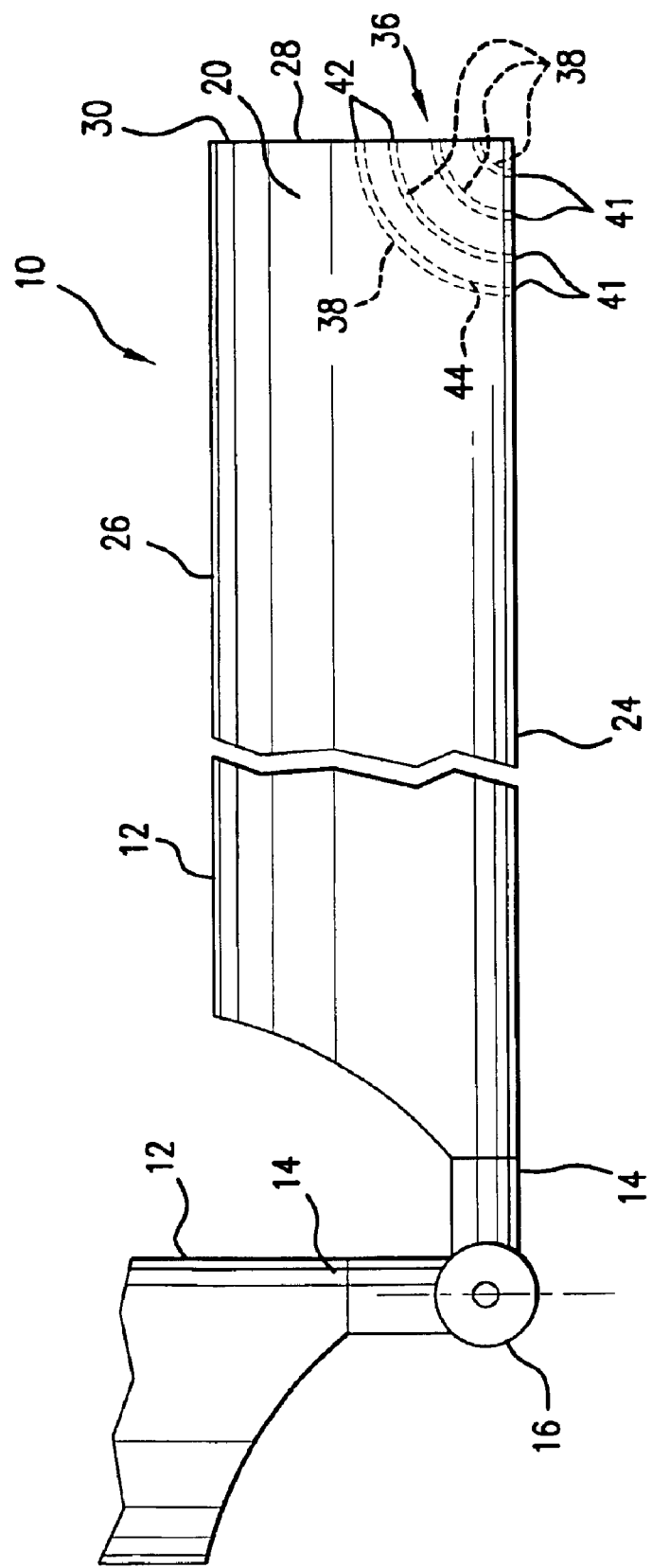

Referring to FIGS. 1A, 1B, and 2, a rotor blade system 10 of the present invention includes a plurality of rotor blades 12 (also referred to herein as slotted blades). Each of the blades 12 are coupled by the end 14 to a central hub 16 in order to perform rotational movements about the rotational axis 18 of the rotor of an aircraft, for example, a helicopter. Each rotor blade 12 has an upper surface 20 and a lower surface 22 which are spaced apart to define an internal volume of the rotor blade therebetween. A leading edge 24 and a trailing edge 26 are formed at the opposing joint edges of the upper and lower surfaces 20 and 22 of the rotor blade 12. Each blade 12 terminates at the blade tip 28 at the end 30 of the rotor blade 12.

The blade tip 28 has a blade tip face 32, best shown in FIG. 2, which is characterized by the chord 34 of the blade tip 28 and the chord plane 40. As a particular example, the blade 12 may be formed of a rectangular platform, untwisted, with a radius of 406 mm (16 inches) and the chord of 44.5 mm (1.752 inches), and is balanced with a counterweight. The experiment blade airfoil section used was the NACA 2415 which was constant throughout the blade 12.

Each blade 12 is formed with the slots (or channels) system 36 formed of a plurality of internal tube members 38 embedded either on the chord plane 40 or between the chord plane 40 and the upper surface 20 of the blade 12. Each tube member 38 has an inlet 41, outlet 42, and a length 44 extending between the inlet 41 and the outlet 42.

The inlets 41 of the internal tube member 38 are located at the leading edge 24 of the blade 12, as shown in FIG. 1B, and form an inlet array. The outlets 42 are located at the blade tip face 32, as shown in FIG. 2, and form an outlet array. The length 44 of each tube member 38 is of an arcuate shape and cover approximately one-fourth of the circle between the leading edge 24 and the blade tip 28. Each internal tube member 38 has a narrow tube diameter compared to the blade thickness. Specifically, in one example, the diameter of the tube member 38 is approximately 3 mm (or 0.067 of the length of the chord 34). Inlet separation, as well as outlet separation, is approximately 7 mm (or 0.157 of the chord 34).

Once a rotational motion of the blades about the rotational axis 18 is initiated, due to the pressure gradient between the inlet and respective outlet, the tube members 38 in the in-channel system 36 bypass a small amount of the incident flow through the blade tip and turn it in the spanwise direction for ejection out from the face 32 of the blade tip 28. In one of the experiments, the rotor system was operated at a tip speed of 89.28 m/s (292.91 ft/s), giving a tip Mach number and chord Reynolds number of 0.26 and 272,000, respectively. A thrust coefficient of $C_T \cong 0.002$ using a collective pitch of 4.0° (measured from the chord plane 40).

Experimental investigation has been conducted on the resulting wake flow field generated by the novel rotor blade system 10 with the embedded internal tube members 38 to (a) understand major factors between the novel blade 12 and existing blades; (b) understand vortex core evolution; (c) obtain the proper control device for evaluation and diffusion of the tip vortex; and, (d) build an empirical model of the tip vortex for the novel rotor blade system 10 of the present invention. Measurements were conducted to quantify the vortex swirl velocity components, the viscous core development, and the overall vertical flow inside the vortex trails. The results were then compared to a plane blade with the unmodified rectangular tip. A single bladed rotor operated in the hovering state was used for all the measurements.

The advantages of the single blade rotor have been addressed in Martin, P. B., Bhagwat, M. J. and Leishman, J. G., "Strobed Laser-Sheet Visualization of a Helicopter Rotor Wake", $2^{nd}$ Pacific Symposium on Flow Visualization and Image Processing, Honolulu, Hawaii, 1999, and Bhagwat, M. J., and Leishman, J. G., "Stability Analysis of Rotor Wakes in Axial Flight", Journal of the American Helicopter Society, Vol. 45, No. 3, 2000, pp. 165–178. This includes the ability to create and study a helicoidal vortex filament without interference from other vortices generated by other blades, thereby allowing the effects of the tip shape to be more clearly delineated. Also, a single helicoidal vortex is much more spatially and temporally stable than with multiple vortices, thereby allowing the tip vortex structure to be studied to much older wake ages and free of the high aperiodicity issues in the flow that usually plague multi-bladed rotor experiments.

In an experiment, the rotor Was tested in the hovering state in a specially designed flow conditioned test cell. The volume of the test cell was approximately 362 m³ (12,800 ft³) and was surrounded by honeycomb flow conditioning systems. This cell was located inside a large 14,000 m³ (500,000 ft³) high-bay laboratory. The rotor wake was allowed to exhaust approximately 18 rotor radii before encountering flow diverts. Aperiodicity levels in the rotor wake were measured using flow visualization, and the aperiodicity statistics were used to correct the velocity field measurements.

Flow visualization images were acquired by seeding the flow using a mineral oil fog strobed with a laser sheet. The light sheet was produced by a dual Nd:YAG laser. The light sheet was located to any location and orientation in the flow using an articulated optical arm. Images were acquired using a high resolution CCD camera. The laser and the camera were synchronized to the rotor one-per-rev frequency, and a phase delay was introduced so that the laser could be fired at any rotor phase (azimuth) angle.

The seed particles were produced by vaporizing oil into a dense fog. A mineral oil based fluid was broken down into a fine mist by adding nitrogen. The mist was then forced into a pressurized heater block and heated to its boiling point where it became vaporized. As the vapor escaped from the heat exchanger nozzle, it was mixed with ambient air, rapidly cooled, and condensed into a fog. The fog/air mixture was passed through a series of ducts and introduced into the rotor flow field at various strategic locations. From a calibration, 95% of the particles were between 0.2 $\mu$m and 0.22 $\mu$ in diameter. This mean seed particle size was small enough to minimize particle tracking errors for the vortex strengths.

Figure 3:
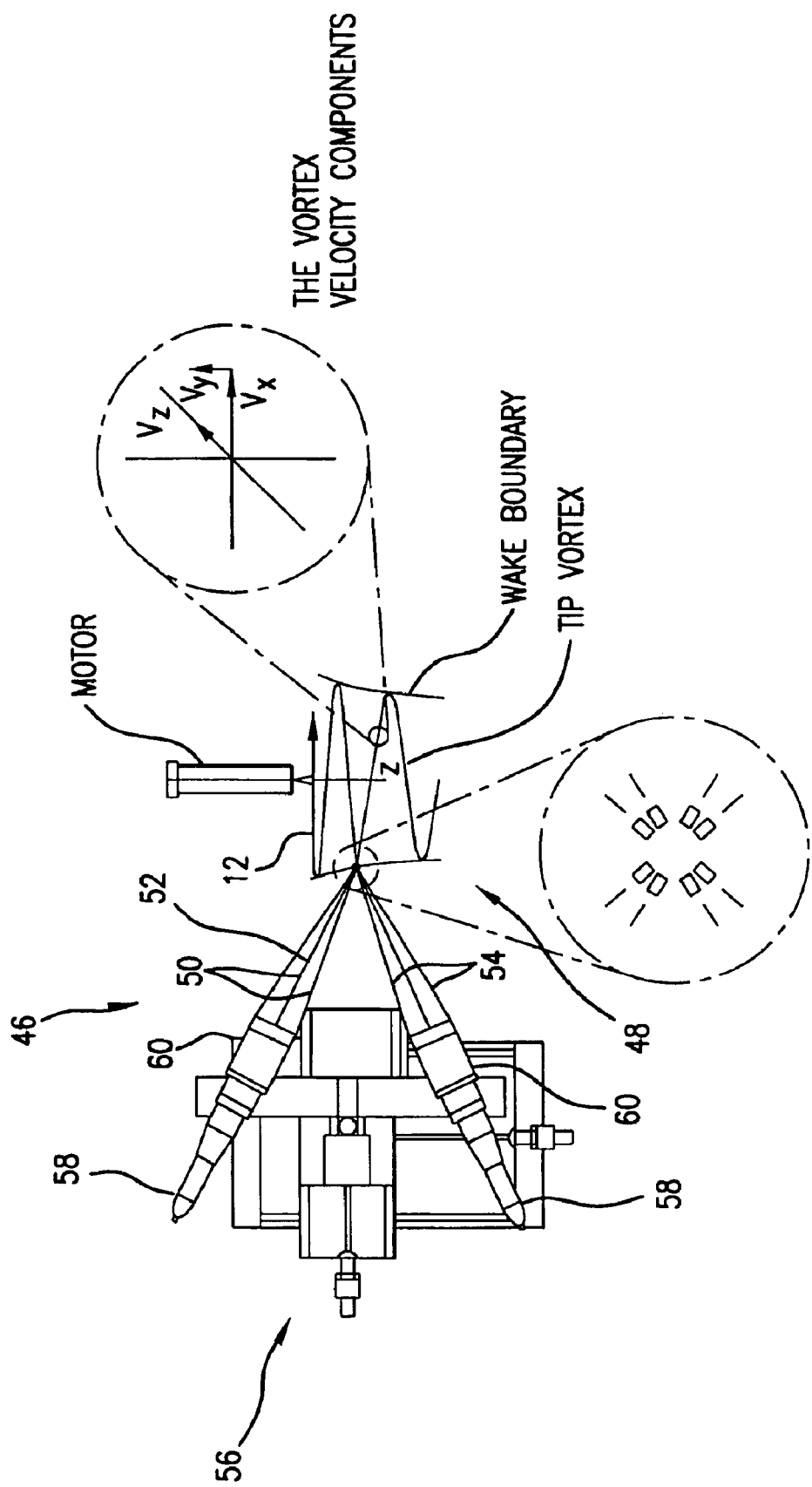
FIG. 3 shows schematically a set-up of the blade rotor and the three component laser Doppler velocimetry (LDV) system designed for measurements of the rotor blade system of the present invention.
Figure 4A:
FIGS. 4A–4F show flow visualization of the vortex wake generated by the base line blade at wake ages of $\gamma=15$, 60, 90, 145, 180, 270, and 375°, respectively.
Figure 4B:
Figure 4C:
Figure 4D:
Figure 4E:
Figure 4F:
Figure 5A:
FIGS. 5A–5F show schematically flow visualization of the vortex wake generated by the slotted blade of the present invention at wake ages of $\gamma=15$, 60, 90, 145, 180, 270, and 375°, respectively.
Figure 5B:
Figure 5C:
Figure 5D:
Figure 5E:
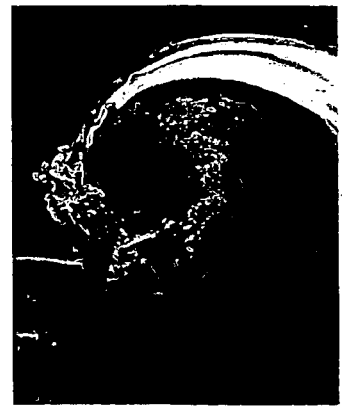
Figure 5F:

Shown in FIG. 3 is a set-up of the rotor under the test and the three-component fiber-optic based laser Doppler velocimetry (LDV) system 46, which was used to make three-component velocity field measurements.

A beam splitter 48 separated a single 6 W multi-line argon-ion laser beam into three pairs of beams (green 50, blue 52, and violet 54), each of which measured a single component of velocity. A Bragg cell, set to a frequency shift of 40 MHz, produced the second shifted beam of each beam pair. The laser beams were passed to the transmitting optics 56 by a set of fiber-optic couplers with single mode polarization preserving fiber optic cables. The transmitting optics 56 were located adjacent to the rotor and consisted of a pair of fiber optic probes 58 with integral receiving optics, one probe for the green and blue pairs, and the other probe for the violet pair. Beam expanders 60 with focusing lenses of 750 mm were used to increase the beam crossing angles, and so to decrease the effective measurement volume.

To further reduce the effective size of the probe volume visible to the receiving optics, an off-axis backscatter technique was used, which is described by Martin, P. B., Pugliese, G. J. and Leishman, J. G., "Laser Doppler Velocimetry Uncertainty Analysis for Rotor Blade Tip Vortex Measurements", AIAA CP 2000–0263, $38^{th}$ Aerospace Sciences Meeting and Exhibit, Reno, Nev. 2000 and Barrett, R. V. and Swales, C., "Realisation of the Full Potential of the Laser Doppler Anemometer in the Analysis of Complex Flows", Aeronautical Journal, Vol. 102, No. 10, 1998, pp. 313–320. This technique spatially filters the effective length of the LDV probe volume on all three channels. Spatial coincidence of the three probe volumes (six beams) and two receiving fibers was ensured to within a 15 $\mu$m radius with an alignment technique based on a laser beam profiler.

The high capacity of the seeder allowed the entire test cell to be uniformly seeded in approximately 30 seconds. Signal bursts from seed particles passing through the measurement volume were received by the optics, and transmitted to a set of photo multiplier tubes where they were converted to analog signals. This analog signal was low band pass filtered to remove the signal pedestal and any high frequency noise.

The large range of the low band pass filter was required to allow measurement of the flow reversal associated with the convection of a vortex core across the measurement grids. The analog signal was digitized and sampled using a digital burst correlator. The flow velocities were then converted into three orthogonal components based on measurements of the beam crossing angles. Each measurement was phase-resolved with respect to the rotating blade by using a rotary encoder, which tagged each data point with a time stamp. The measurements were then phase-averaged into one-degree bins.

The flow visualization experiments gave considerable insight into the tip vortex developments and the changes in the filament structure as it was convected through the flow below the rotor. Sequential time images of planes through the vortex core were obtained. For the baseline blade, the results for which are shown in FIGS. 4A–4F, the tip vortex and its inner core region are shown for wake ages of $\zeta=15$, 60, 90, 145, 180, 270 and 375 degrees. The image at $\zeta=15$ degrees also shows the shadow of the blade tip, which is just about to leave the illuminated image plane.

As is apparent from FIGS. 4A–4F, the vortex core center is demarcated as being distinctly void of seed particles; this void becomes larger as the vortex ages. The void (which is not equal to the viscous core dimension) occurs due to the centrifugal and Coriolis forces acting on the seed particles, which are caused by high particle accelerations near the vortex core. The flow visualization shows clear features in the resulting vortex core structure. The overall flow structure suggests a significant radial partitioning of the vortex development, as can be seen in each of the images in FIGS. 4A–4F. This radial partitioning is a final part of the transitional process. It is well-known in fluid dynamics that any flow energy containing a large eddy like tip vortex must experience equi-partitioning (or cascading) into many tiny eddies during its diffusing or decaying process.

Moving out in the radial direction from the core center, FIGS. 4A–4F show that there first appears smooth circular bands of seed. This suggests a relatively laminar core region with little or no flow mixing. Here, diffusion of vorticity can occur only at a molecular level, which is extremely slow. Outside of this region, there are many eddies and considerable turbulent mixing. This mixing contributes to the overall vorticity diffusion mechanism which helps to more rapidly diffuse the vorticity away from the vortex. Overall, it can be seen from this set of sequential flow visualization images that the tip vortex grows from a mostly laminar flow structure at young wake ages to a somewhat more overall diffused and turbulent flow structure as the vortex ages. However, it is significant to notice that in this case the tip vortex retains its laminar inner core at all wake ages.

It is also notable that the vortex sheet trailing from the inner part of the blade is connected to the tip vortex. This vortex sheet, which is composed of small scale turbulent eddies that have their origin from the merging upper and lower boundary layers on the blade does not have sufficient intensity to substantially influence the development or diffusion of the tip vortex itself. Furthermore, it is apparent that as these eddies become entrained into the tip vortex where they appear to be damped out and the flow then becomes much more laminar. This is why devices that attempt to modify the tip vortex structure by creating turbulence outside the core boundary are largely ineffective in diffusing vorticity.

Flow visualization results from the blades of the present invention are shown in FIGS. 5A–5F, images from which were obtained at comparable wake ages as for the baseline blade. In this case, it was apparent that as the tip vortex forms and rolls-up along the tip side-edge, the exit flow from the slots act in such a way as to break up the laminar core region. Therefore, this initial action begins to quickly promote turbulence generation inside the innermost region of the tip vortex core which would otherwise remain laminar.

As can be seen from the flow visualization images there is little evidence of a well-defined laminar core region. Furthermore, there is no seed void at the core center which confirms enhanced flow mixing. Therefore, it is apparent that the slots promote flow mixing inside the tip vortex and it can be expected that the tip vortex generated by the slotted blade is initially more diffused. It can also be expected to defuse faster than it does for the baseline case (as evidenced by quantitative measurements to be discussed in following paragraphs). Since the tip vortex generated by the slotted blade has no apparent laminar core region, even in the early stages after formation, it may also be influenced more easily by action of external effects such as by the entrainment of the vortex sheet or by interactions with adjacent vortices.

To further investigate how the channel system 36 functions to destroy the inner laminar region of the tip vortex and to enhance turbulent diffusion of vorticity away from the vortex core, close-up flow visualization images in the blade tip region were obtained by placing the laser sheet at different orientations, and making zoom images from two different observation angles, mainly parallel and perpendicular to the rotor tip path plane.

Figure 6A:
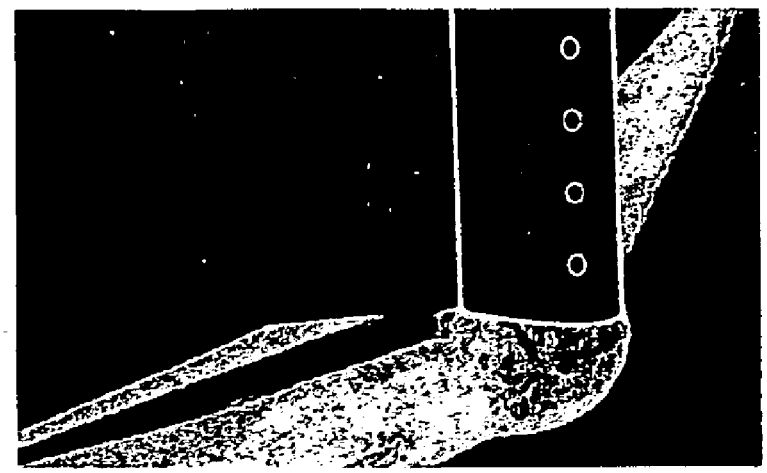
Figure 6B:
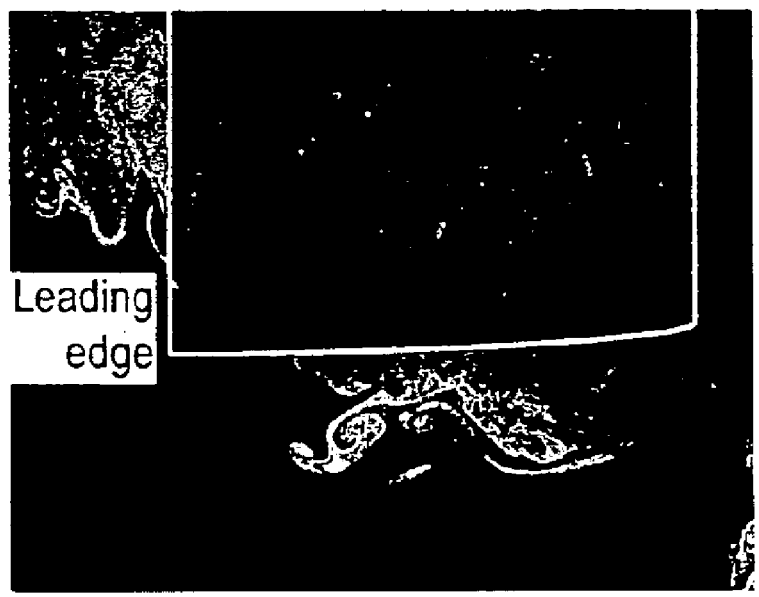
Figure 8A:
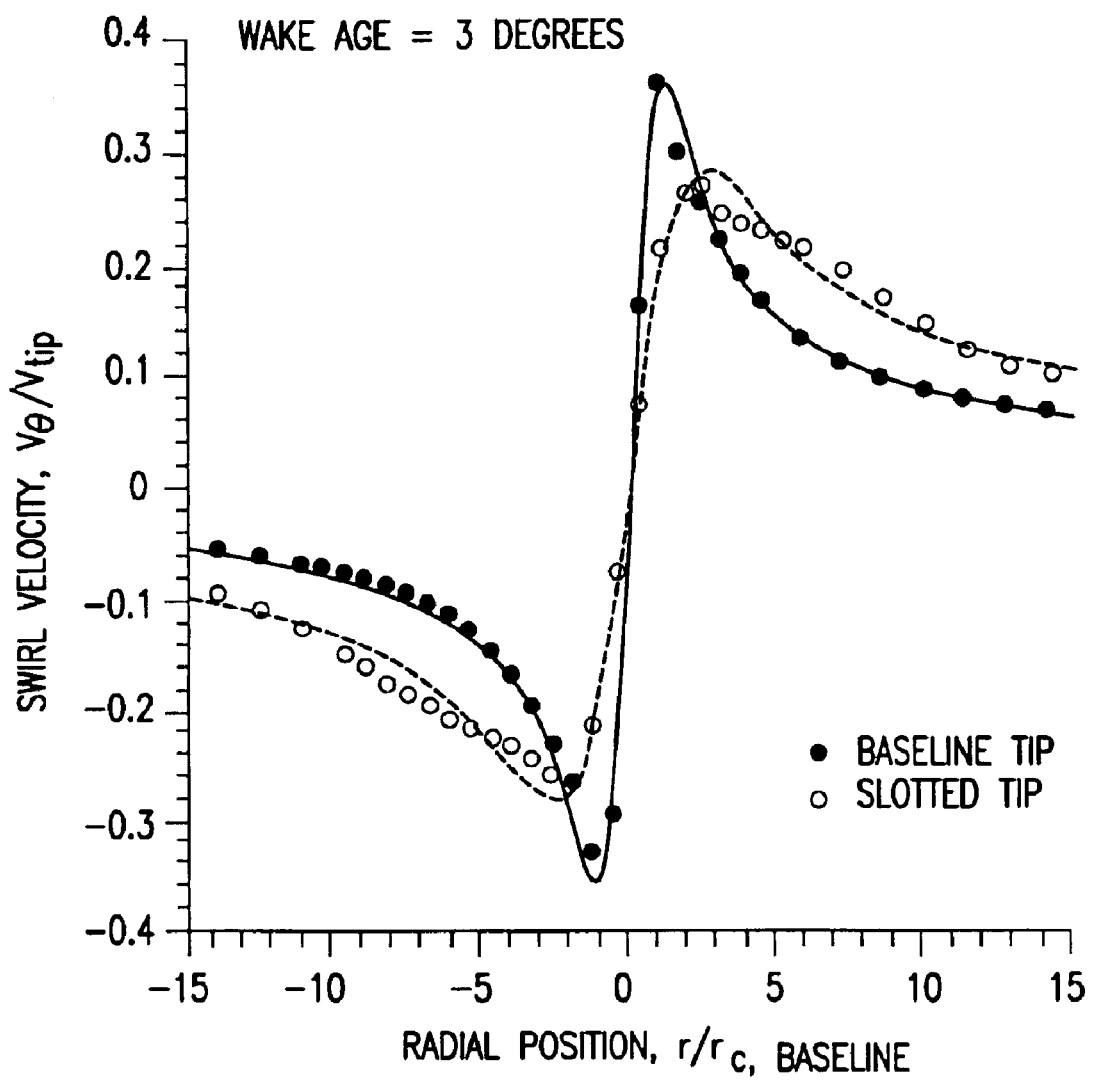
FIGS. 8A–8E are diagrams of swirl velocities of a baseline blade and the slotted blade of the present invention at their comparable wake ages, at $\gamma=3°$, $\gamma=29°$, $\gamma=56°$, $\gamma=144°$, and $\gamma=185°$, respectively (solid line is for the base line blade and dashed line is for the slotted blade of the present invention)
Figure 8B:
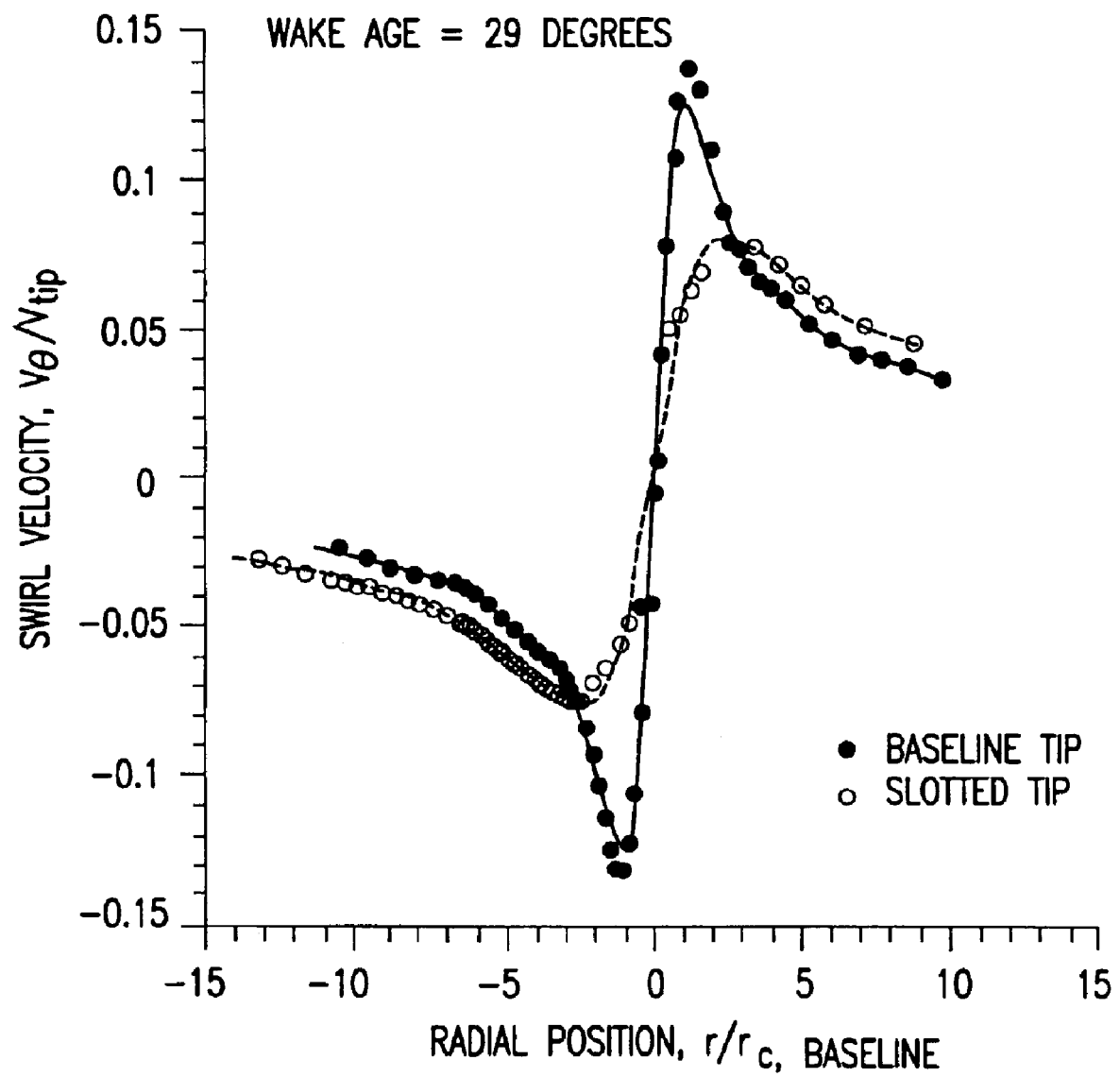
Figure 8C:
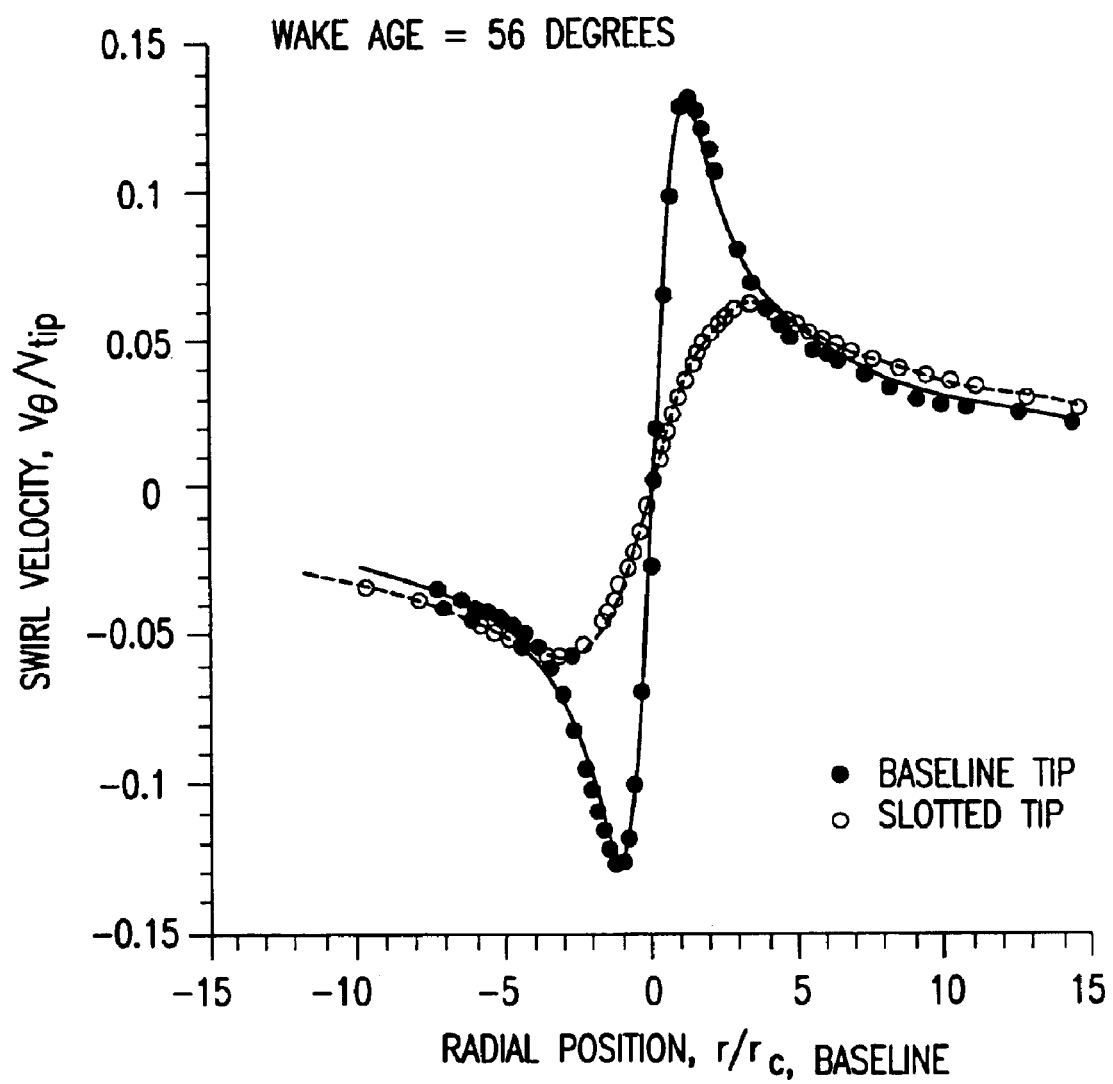
Figure 8D:
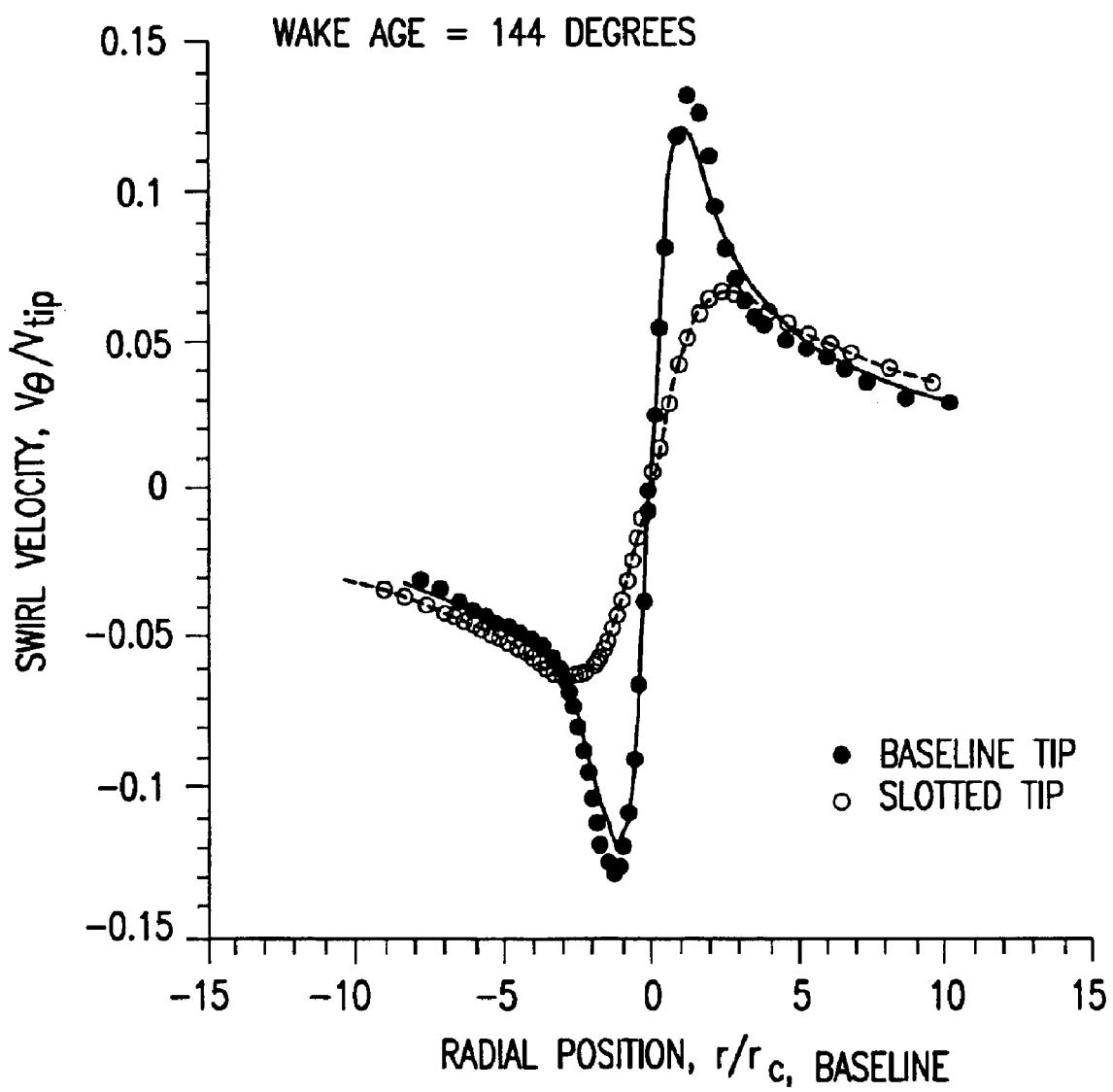
Figure 8E:
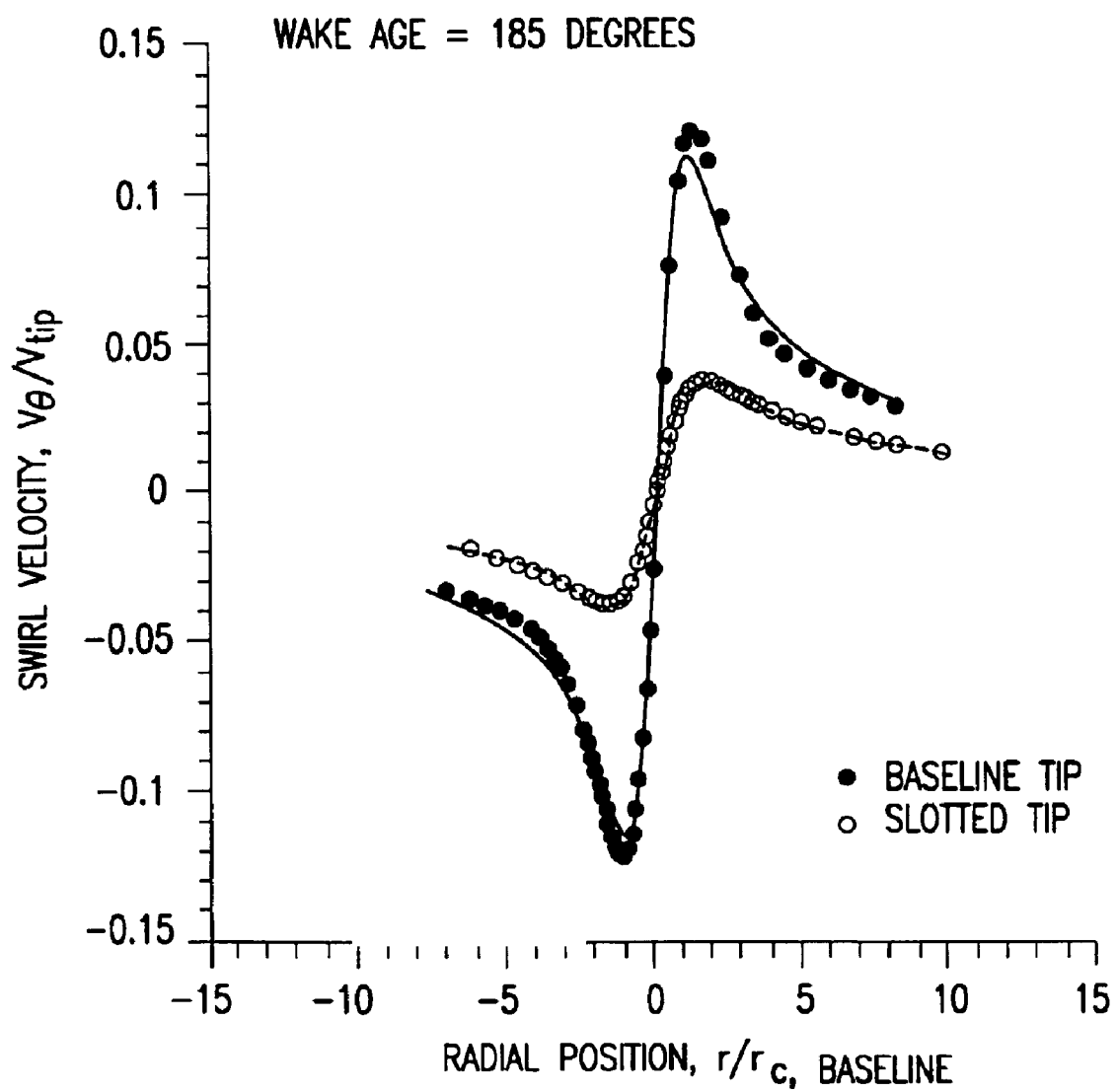

Representative results are shown in FIGS. 6A, 6B. As can be seen in these images, the four tubular members 38 in the tip 28 allow a slight amount of flow to pass through the slots and exit as turbulent jets at the blade tip face 32. It was found from the flow visualization, that small, discrete, turbulent vortlets were formed at each of the slot exits. It is apparent that there are two forms of coherent flow structures in this case. First, there is an overall roll-up of the tip vortex similar to the baseline blade. Second, an inner bundle of turbulent vortlets are formed, which rotate in the same direction. These vortlets roll up around each other and penetrate the inner region of the vortex core. This mechanism acts to dissolve the inner laminar region and promote turbulence. A schematic of the formation process is given in FIGS. 7A, 7B, which has been deduced from many flow visualization images.

When these turbulent vortlets fill the void of the vortex core, they introduce flow mixing and dissolve the laminar core region that would otherwise be caused by the strong angular momentum at the beginning of the vortex roll-up. Consequently, this process acts to defuse the vorticity inside the tip vortex much more rapidly than for the baseline tip, even although it is apparent from the flow visualization that the tip vortex still exists in a coherent form. Basically, the tip vortex from the slotted blade still retains the partitioning features, but now the effect of the turbulent core becomes the dominant process that affects the process of vortex diffusion.

The velocity field and net rate of vorticity diffusion of the vortex from the slotted blade was quantified by LDV measurements, which are discussed in following paragraphs.

Swirl Velocity Comparisons

Results for the swirl component of the velocity in the tip vortex at various wake ages are shown in FIGS. 8A–8E. All the measurements were corrected for flow aperiodicity effects. The results have also been placed in a reference axis moving with the convecting flow, so that the measured convection velocity has been removed.

Compared to the measurements made on the baseline blade, it is apparent that the peak values induced by the slotted blade were reduced by 20% to as much as 60% at comparable wake ages, as shown in Tables 1 and 2.

TABLE 1

Core radius and peak swirl velocity for the baseline blade.

| Wake age (deg.) | $r_c$ | $V_{\theta max}/\Omega R$ |
|---|---|---|
| 3.0 | 0.016 | 0.3540 |
| 29.0 | 0.054 | 0.1339 |
| 56.0 | 0.052 | 0.1281 |
| 144.0 | 0.066 | 0.1295 |
| 185.0 | 0.090 | 0.1225 |
| 265.0 | 0.092 | 0.1181 |
| 362.0 | 0.120 | 0.1055 |
| 438.0 | 0.102 | 0.0903 |

TABLE 2

Core radius and peak swirl velocity for the slotted blade.

| Wake age (deg.) | $r_c$ | $V_{\theta max}$(base) |
|---|---|---|
| 2.0 | 0.040 | 0.786 |
| 28.0 | 0.128 | 0.627 |
| 58.0 | 0.164 | 0.456 |
| 145.0 | 0.170 | 0.528 |
| 185.0 | 0.148 | 0.328 |

Relocating the slot entrances slightly above the chord line is found to be more effective in diffusing the tip vortex core than for the slot entrance on the blade located closer to the chord line at the leading edge.

Figure 9A:
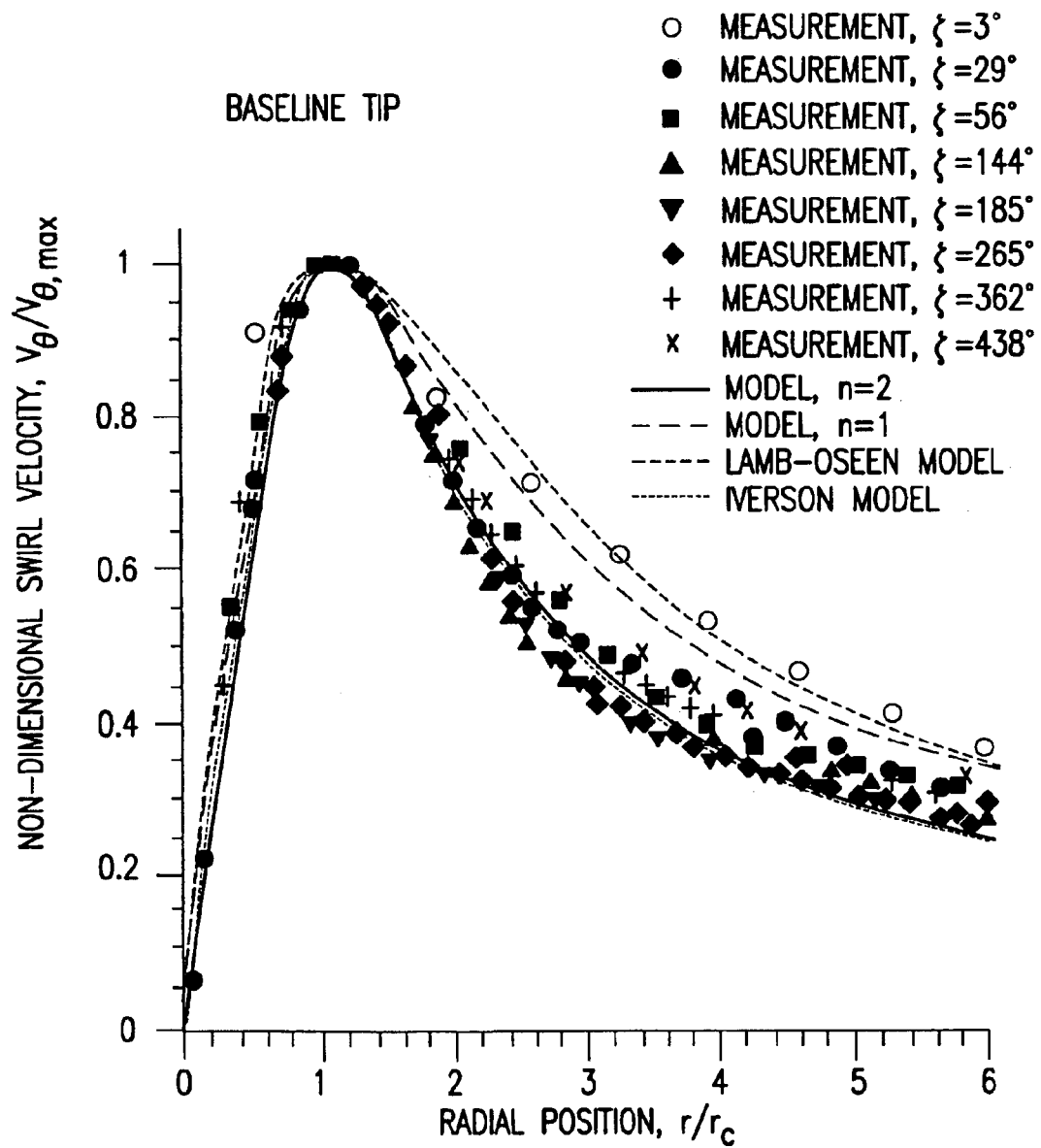
FIGS. 9A and 9B show respectively diagrams of the normalized swirl velocity components for a base line tip and the slotted tip of the rotor blade of the present invention.
Figure 9B:
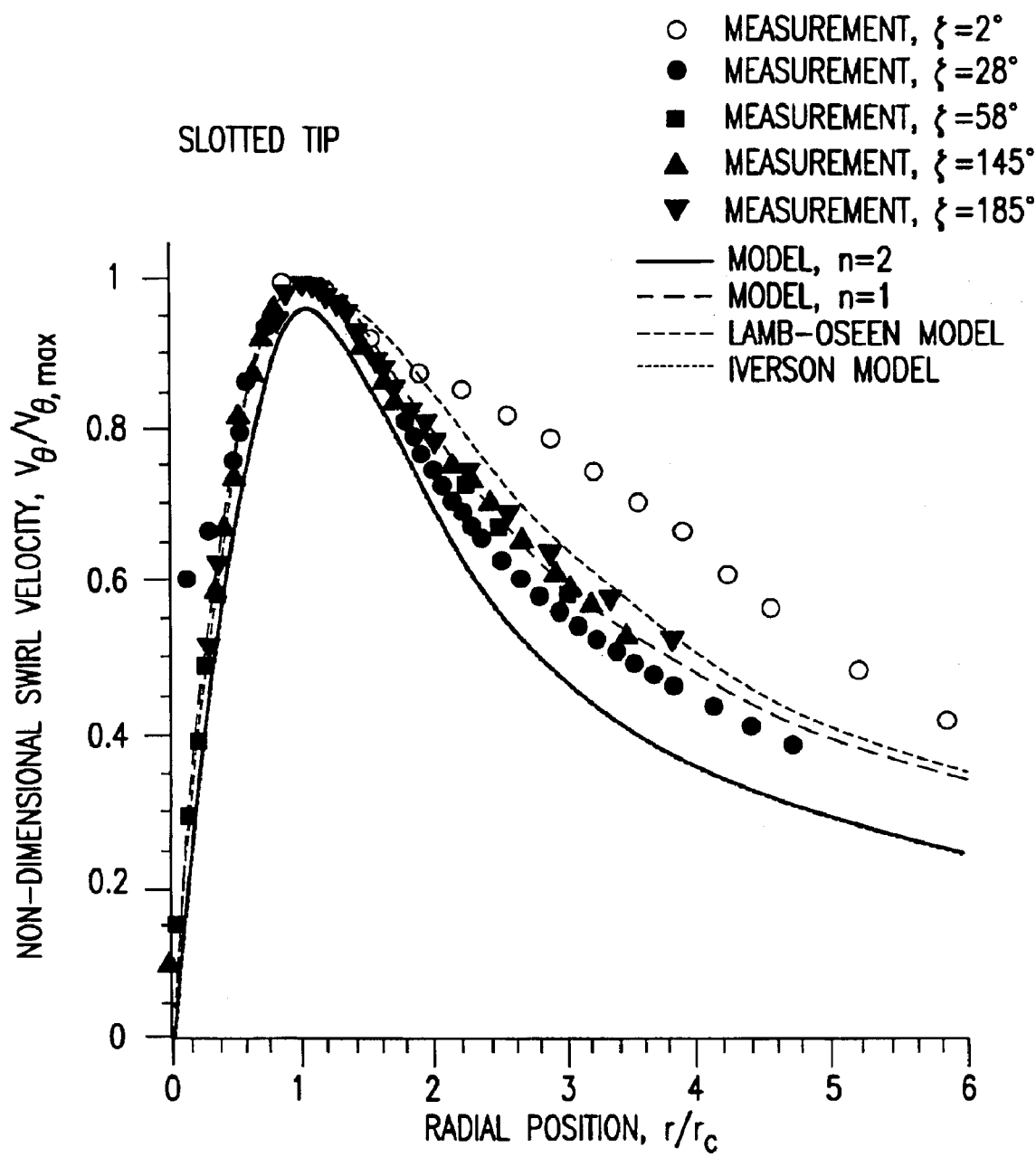

By plotting the swirl velocities non-dimensionalized by the peak swirl velocity against the distance from the core non-dimensionalized by the core radius, a series of fairly self-similar profiles were obtained, as shown in FIGS. 9A, 9B. The results are shown separately for the baseline tip and the slotted tip of the present invention.

In each case, the swirl velocity from a series of standard desingularized vortex models are shown for reference. At the earliest wake ages ($\zeta=3°$) it is apparent that the tip vortex is still in the process of formation. For the later wake ages, the swirl velocity of the slotted blade compares fairly well to the n=1 case of the Vatistas general algebraic model (Vatistas, G. H., Kozel, V., and Mih, W. C., "Simpler Model for Concentrated Vorticies", Experiments in Fluids, Vol. 24, No. 11, 1991, pp. 73–76) bit better to the classic Lamb-Oseen model (Lamb, H., Hydrodynamics, 6$^{th}$ Ed. Cambridge University Press, Cambridge, UK, 1952; Oseen, C. W., "Uber Wirbelbewegung in Einer Reiben den Flussigkeit", Ark. J. Mat. Astrom. Fys., Vol. 7, 1912, pp. 14–21). These observations imply that the slotted blade generates somewhat milder velocity gradients within the core region, which is a direct manifestation of the production of turbulent vortlets and small eddies during the initial stages of tip vortex formation.

Viscous Core Developments

The vortex core radius is nominally half the distance between the peaks in the swirl velocity profile. A more precise and less subjective determination of the core radius was made by fitting a curve to the measurements in a least squares sense (FIGS. 8A–8E), and finding the peak velocity and corresponding core size from the curve fit.

Figure 10:
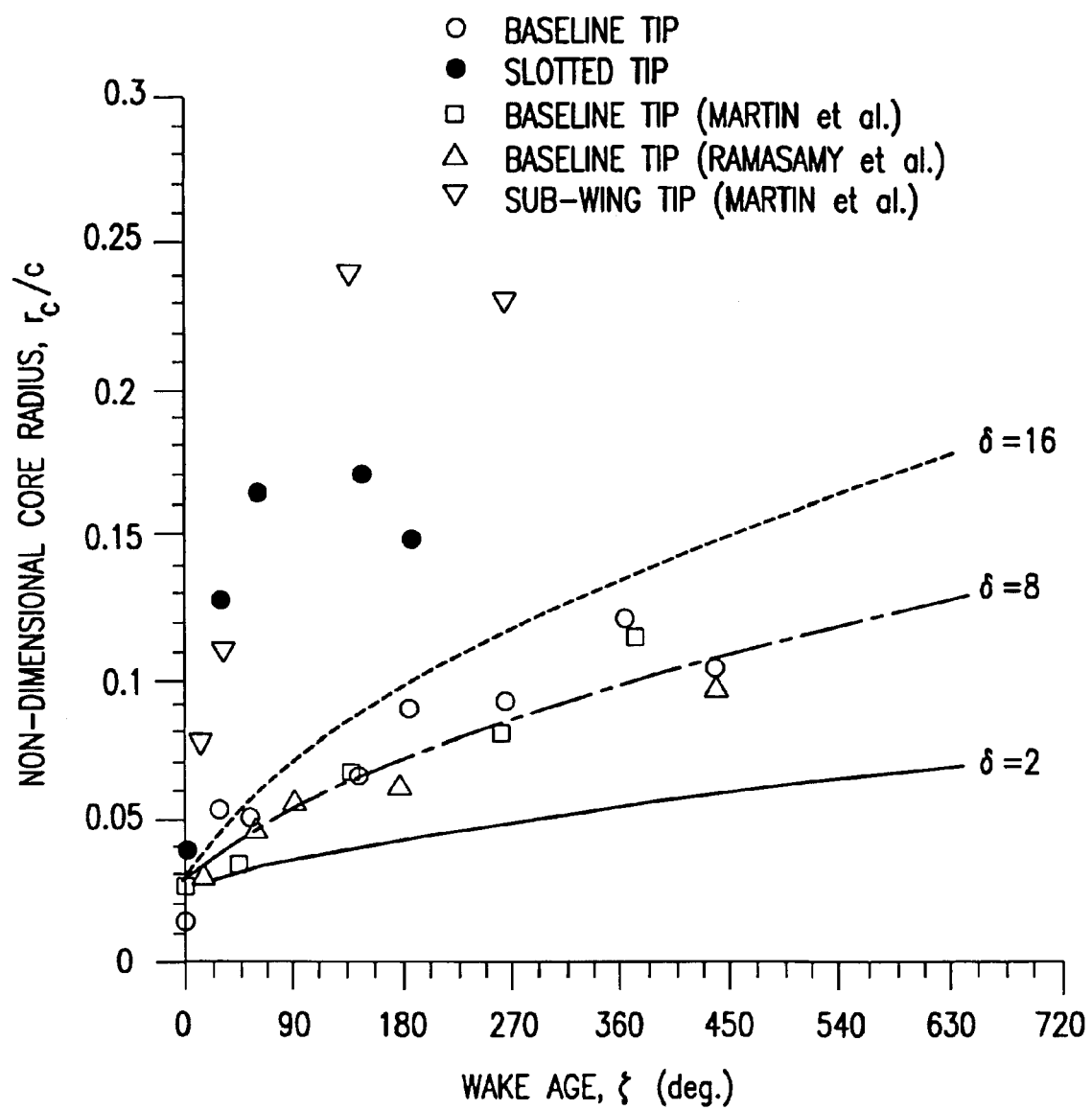
FIG. 10 is a diagram showing the growth in the vortex core radius (inferred from velocity profiles) as a function of wake age.

As shown in FIG. 10 and in Tables 1 and 2, the results show that the tip vortex core sizes for the slotted blade tip are between 1.6 to 3.1 times larger than for the baseline blade when compared at comparable wake ages.

While a variety of mathematical models have been suggested for the diffusion of tip vortices, one of the simplest is the classic Lamb-Oseen model.

The Lamb-Oseen model of the tangential velocity in the vortex can be written as $$V_\theta(\bar{r}) = \frac{\Gamma}{2\pi r_c}\left[\frac{1-\exp(-\alpha\bar{r}^{-2})}{\bar{r}}\right] \quad \text{(Eq. 1)}$$

where $\alpha=1.25643$, $\bar{r}$ is the non-dimensional radius based on the estimated core radius, $r_c$, at that wake age, and $\Gamma$ represents circulation parameter.

A series of general desingularized velocity profiles is given in Vatistas, et al., "Simpler Model for Concentrated Vortices", Experiments in Fluids, Vol. 24, No. 11, 1991, pp. 73–76, where the tangential velocity in a two-dimensional cross-sectional plane of the vortex is expressed as $$V_\theta(\bar{r}) = \frac{\Gamma}{2\pi r_c}\left[\frac{\bar{r}}{(1+\bar{r}^{2n})^{\frac{1}{n}}}\right] \quad \text{(Eq. 2)}$$

where n is an integer variable. The velocity profiles for three special vortex models with a particular value of n in the above equation, can be written as 1. n→∞, Rankine vortex:

$$V_\theta(\bar{r}) = \begin{cases} \frac{\Gamma}{2\pi r_c}\bar{r} & 0 \le \bar{r} \le r_c, \\ \frac{\Gamma}{2\pi r_c}\left(\frac{1}{\bar{r}}\right) & \bar{r} \ge r_c \end{cases} \quad \text{(Eq. 3)}$$

2. n=1 vortex:

$$V_\theta(\bar{r}) = \frac{\Gamma}{2\pi r_c}\left[\frac{\bar{r}}{(1+\bar{r}^2)}\right] \quad \text{(Eq. 4)}$$

3. n=2 vortex:

$$V_\theta(r) = \frac{\Gamma}{2\pi r_c}\left[\frac{\bar{r}}{\sqrt{1+\bar{r}^{-4}}}\right] \quad \text{(Eq. 5)}$$

All these velocity models satisfy the boundary conditions $$V_\theta(\bar{r}) = \begin{cases} 0 & \bar{r}=0, \\ V_{\theta max} & \bar{r}=1. \end{cases}$$

$$V_\theta(\bar{r}) \to 0 \text{ as } \bar{r} \to \infty$$

It is important to note that the circulation at large $\bar{r}$ does not approach zero but asymptotically approaches to a constant value $\Gamma$. However, the maximum swirl velocity at $\bar{r}=1$ has different values for the different models. This results in the following core circulation to total circulation ratio.

1. Lamb vortex:

$$\frac{\Gamma_c}{\Gamma} = 1 - \exp(-\alpha) = 0.7153 \qquad (\text{Eq. 6})$$

where $\Gamma_c$ is a core circulation.

2. $n \to \infty$, Rankine vortex:

$$\frac{\Gamma_c}{\Gamma} = 1 \qquad (\text{Eq. 7})$$

3. n=1 vortex:

$$\frac{\Gamma_c}{\Gamma} = 2^{-1/n} = 0.5 \qquad (\text{Eq. 8})$$

4. n=2 vortex:

$$\frac{\Gamma_c}{\Gamma} = 2^{-1/2} = 0.707 \qquad (\text{Eq. 9})$$

However, the spin down of the swirl velocity and core growth given by the Lamb-Oseen model is found to be unrealistically slow when compared to measurements. This is because of the laminar flow assumptions invoked in the model; that is, molecular diffusion throughout the vortex is allowed.

In light of consolidated experimental evidence (Bhagwat, M. J., and Leishman, J. G., "Viscous Vortex Core Models for Free-Vortex Wake Calculations", Proceedings of the 58$^{th}$ Annual Forum of the American Helicopter Society International, Montreal Canada, Jun. 11–13, 2002), empirically modified Lamb-Oseen growth models are found to give better representations of the velocity fields surrounding rotor tip vortices. Bhagwat, et al. have modified the Squire model (Squire, H. B., "The Growth of a Vortex in Turbulent Flow", The Aeronautical Quarterly, August 1965, pp. 302–305) with the inclusion of an average apparent viscosity parameter δ to account for turbulence mixing on the net rate of viscous diffusion, effectively increasing the viscous core growth rates to values that are more consistent with experimental observations. The viscous core radius, $r_c$, of the tip vortices can then be effectively modeled as a function of age, ζ, using the equation $$r_c(\varsigma) = \sqrt{4\alpha\delta v\left(\frac{\varsigma - \varsigma_0}{\Omega}\right)} = \sqrt{r_0^2 + \frac{4\alpha\delta v\varsigma}{\Omega}} \qquad (\text{Eq. 10})$$

wherein α is the Oseen constant, δ is effective diffusion constant, ν is kinematic viscosity, Ω is rotor rotational speed.

If δ=1 then the Lamb-Oseen result is obtained. The ordinate-shift, $\varsigma_0$, is responsible for the non-zero effective core radius, $r_0$, at the tip vortex origin (where ζ=0°), to give a more physically correct (finite) induced velocity there compared to the Lamb-Oseen result. The results in FIG. 10 suggest that a value of δ=8 is appropriate for the baseline tip case, whereas the slotted blade tip shows considerably higher values.

To better appreciate the increase in the core size and change in the vortex core structure obtained with the slotted blade, the measured core dimension is superimposed on a close-up flow visualization image at three different wake ages, as shown in FIGS. 11A–11C. Results are shown for both the baseline and slotted blades at approximately the same wake age. It is clear that the slotted blade has caused the core dimension to grow significantly compared to the baseline case. As previously mentioned, the introduction of the turbulent eddies from the slot exits encourages turbulent mixing within the otherwise laminar vortex core, and a more rapid radial diffusion of vorticity is produced. This mechanism causes the vortex core to grow much more rapidly as it ages in the flow.

Richardson Number

Cotel, et al. (Cotel, A. J., and Breidenthal, R. E., "Turbulence Inside a Vortex", Physics of Fluids, Vol. 11, No. 10, 1999, pp. 3026–3029) have made a study of tip vortices trailed by fixed wings, and suggested that the diffusion of vorticity in the vortex core is dominated by laminar flow effects. Bradshaw, P., "The Analogy Between Streamline Curvature and Buoyancy in Turbulent Shear Flows", Journal of Fluid Mechanics, Vol. 36, Part 1, pp. 177–191 assumes that the high rotational velocities cause stratification inside the vortex core and uses a Richardson number to explain the concept. The attainment of a critical value of the Richardson number, which is a function of vortex Reynolds number, suggests that the rotational velocity can become high enough to prevent the development of turbulence within that region of the vortex. This model is of interest because it helps to explain the vortex behavior seen with the slotted tip.

The local Richardson number is defined as $$Ri = 2S_p(S_p + 1) \qquad (\text{Eq. 11})$$

where the shape factor $S_p$ is defined in terms of the swirl velocity profile as $$S_p = \frac{V_\theta}{r} \Big/ \frac{dV_\theta}{dr} \qquad (\text{Eq. 12})$$

Figure 12A:
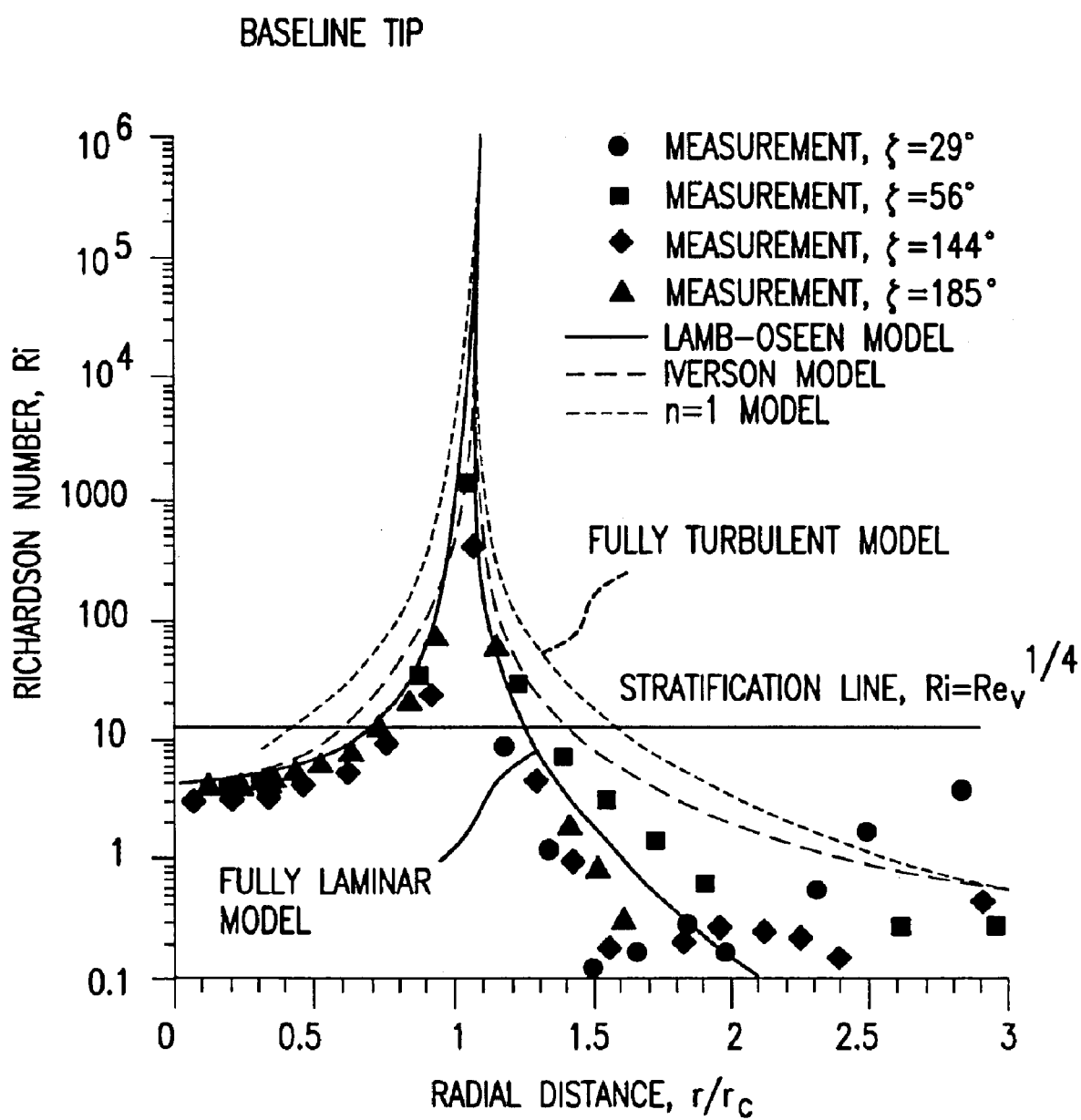
FIGS. 12A and 12B show distribution of local Richardson number for the baseline blade and the slotted tip blade of the present invention, respectively.
Figure 12B:
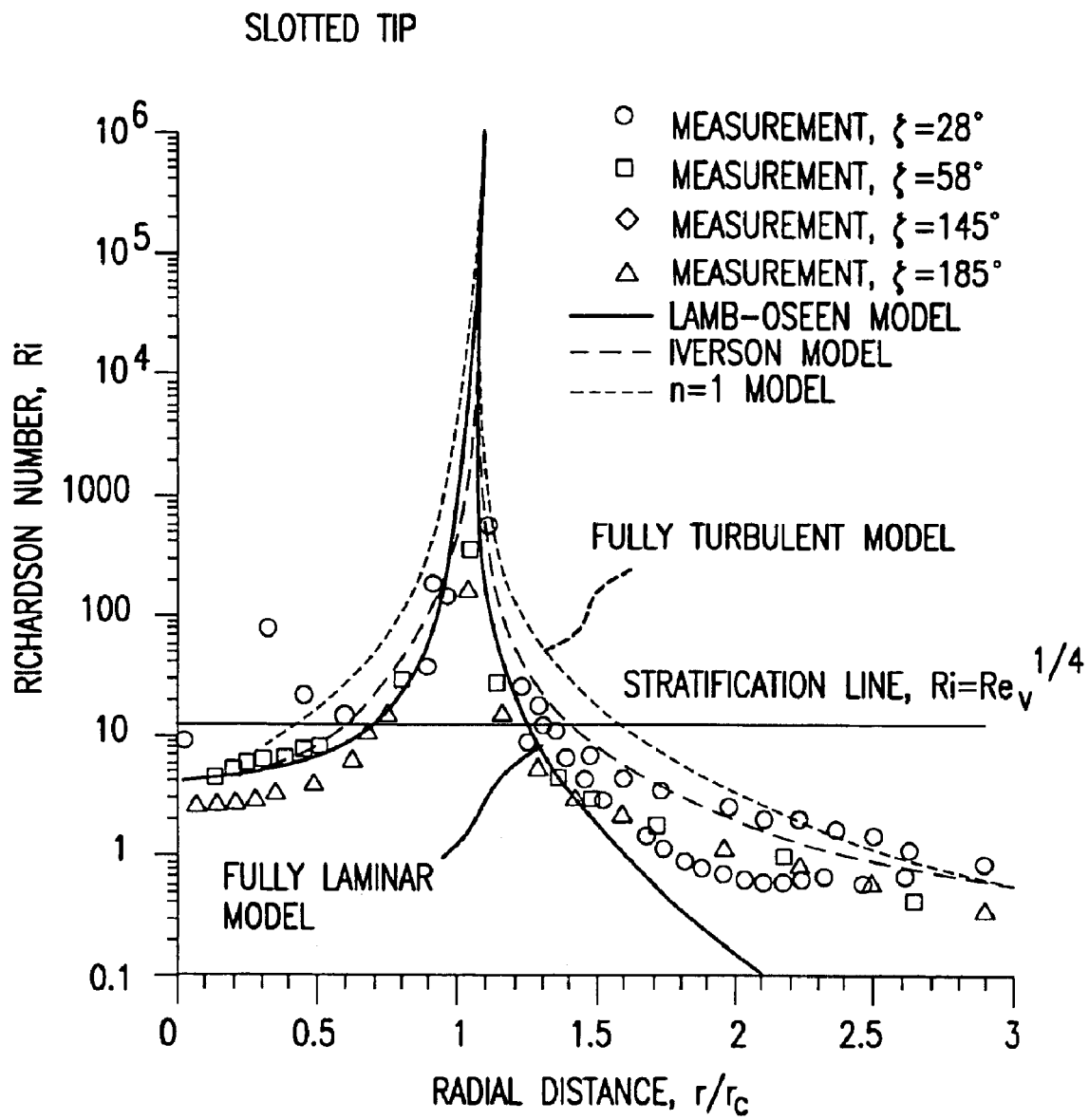

From the measured swirl velocity profiles, the corresponding distribution of the local Richardson number can be calculated, which is plotted in FIGS. 12A–12B for both blade tips. The critical Richardson number is given in Cotel, et al. in terms of the vortex Reynolds number as $$Ri(\text{critical}) = Re_v^{1/4} \qquad (\text{Eq. 13})$$

It is hypothesized that the attainment of the critical Richardson number will prevent the formation of turbulent eddies or re-laminarize any entrained eddies, and so will allow diffusion to take place in this region only by the relatively slow process of molecular diffusion.

Notice that the denominator in the shape factor in Eq. 12 requires the evaluation of the radial gradient of the swirl velocity profiles, thus care must be taken in determining the slope of the velocity profile near the core radius where its rate of change is high. It is notable that there is not much difference in the Richardson number results between both blade tips, as shown in FIGS. 12A and 12B. Yet compared to the baseline tip case, which fits well to the fully laminar Lamb-Oseen model, the tip vortex of the slotted blade tends to have values of the Richardson number that suggests an overall more turbulent vortex structure, mainly because it follows the result based on the fully turbulent Iversen profile (Iversen, J. D., "Correlation of Turbulent Trailing Vortex Decay Data", Journal of Aircraft, Vol. 13, No. 3, 1976, pp. 338–342). This is consistent with the flow visualization results, as presented in previous paragraphs.

Based on the foregoing observations, the high rotational velocities allow stratification of the flow around the vortex core boundary even for the slotted blade. It means that during the partitioning process the small eddies that may develop and surround the core boundary cannot progress into the core region. This implies that the vortex will defuse relatively slowly. Furthermore, this process may be affected by the adjacent interference of another part of the vortex spiral, which can interchange fluid: It is also clear that the turbulent vortlets produced at the face of the slotted blade cannot immediately pass out of the core region but instead act to make the core region homogeneously turbulent and promote the more rapid growth of the core radius. Because the laminar core center of the vortex has a low static pressure, the laminar vortex allows the vortlets generated by the slots to enter the core region easily. It is, however, apparent that the slotted blade design is an effective device in diffusing the vorticity in the vortex and thus reducing the peak swirl velocities.

Vortex Circulation

The vortex circulation $\Gamma$ can be estimated from the measured swirl velocity distributions given previously using the following axisymmetric flow definition $$\frac{\Gamma}{\Omega R c} = 2\pi \left(\frac{V_\theta}{\Omega R}\right)\left(\frac{r}{c}\right) \quad \text{(Eq. 14)}$$

where $\Omega$ is rotor rotational speed, R is rotor radius, c is rotor blade chord, and $V_\theta$ is swirl velocity.

Figure 13A:
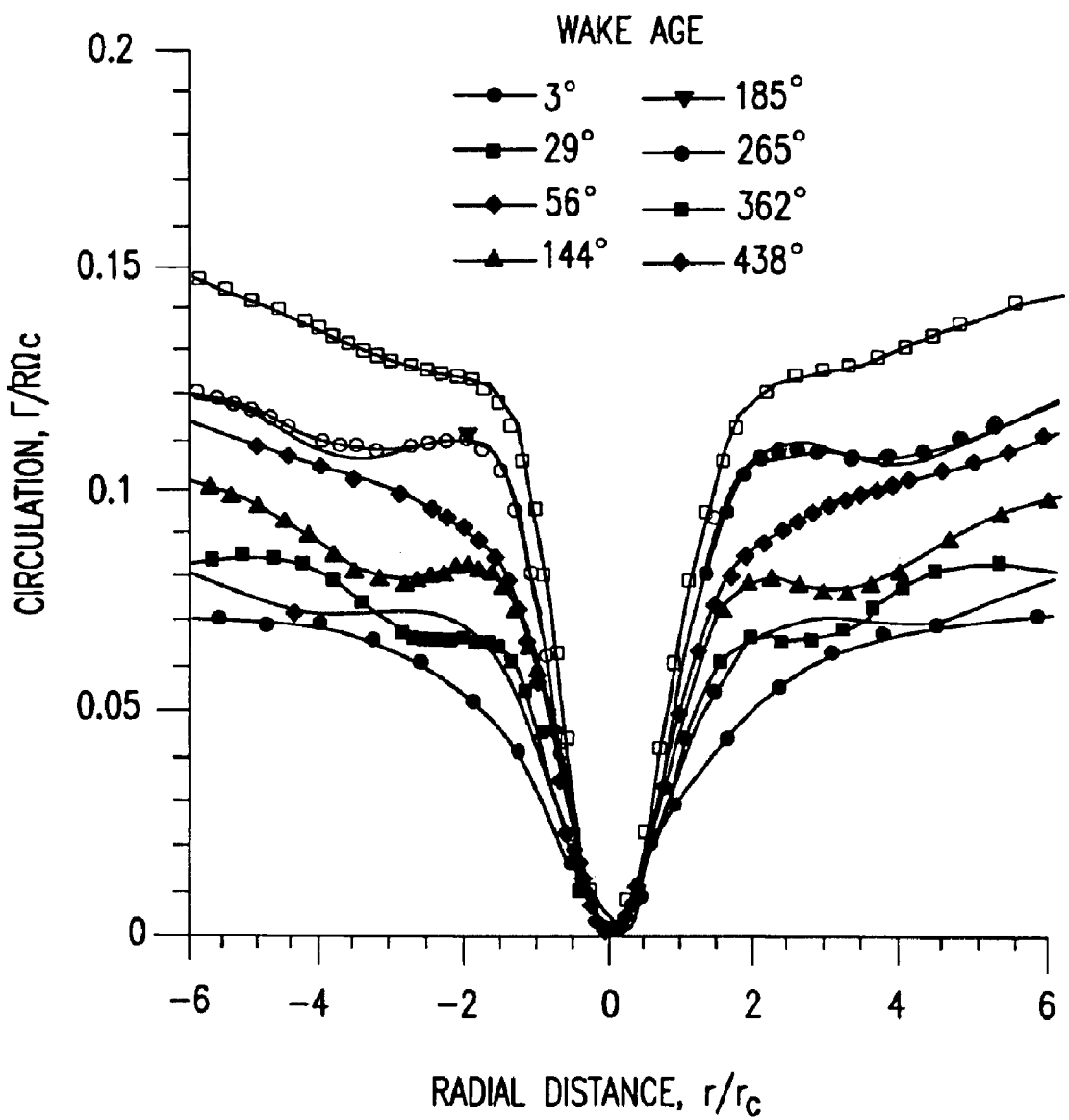
FIGS. 13A and 13B are the distribution diagrams of local circulation for the baseline blade and the slotted tip blade of the present invention, respectively.
Figure 13B:
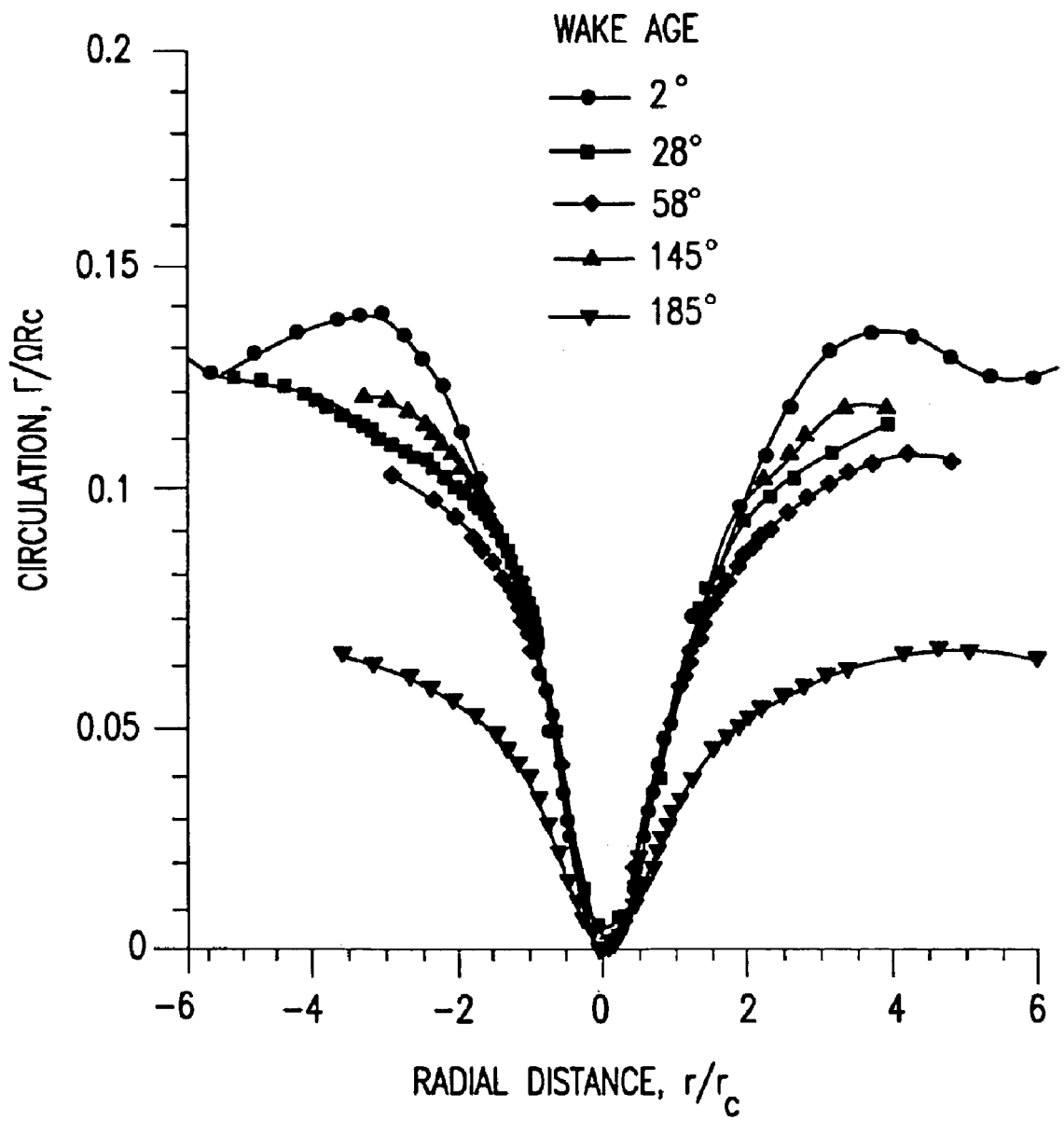

The results are shown in FIGS. 13A–13B. In the case of the baseline tip at the earliest wake age, the tip vortex is still in the process of formation and has not attained its full strength. At later wake ages, it is apparent that there is substantial scatter in the values of circulation. This is not unexpected as it is well known that far-field value of tip vortex strength in a rotor wake is difficult to measure because it is difficult to exclude extraneous circulation for other parts of the flow field such as the vortex sheet. Because the vortex generated by the slotted blade has a more diffused and radially expanded core region, it is more difficult to obtain the net value of the induced circulation at large radial distances.

Figure 14:
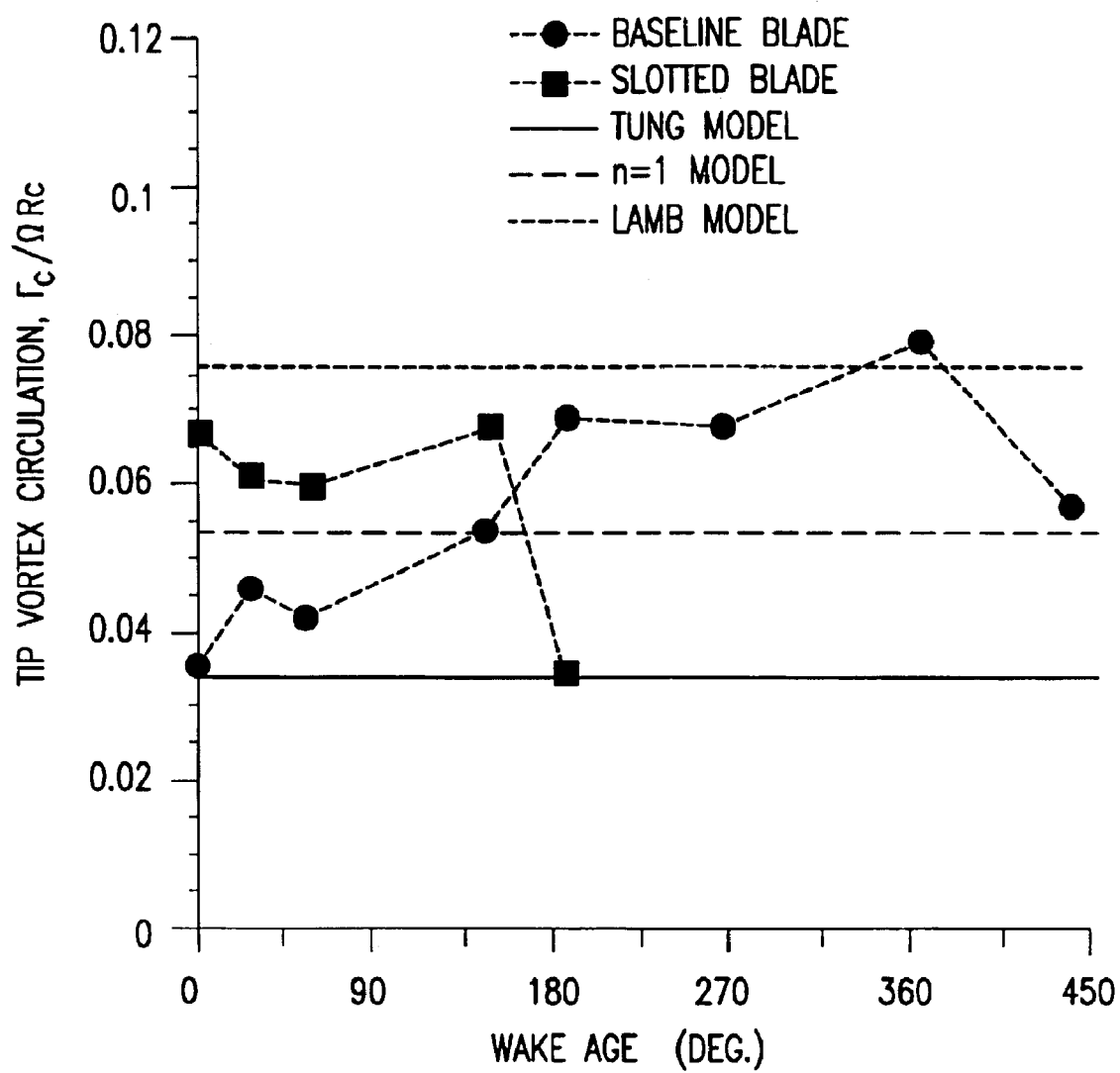
FIG. 14 is a diagram showing core circulation vs. wake age for the base line and slotted blade tips; and, FIG. 15 is a diagram showing a power curve as a function of rotor RPM for both the baseline blade and the slotted blade of the present invention.

In, light of this, the circulation at a specified radial distance from the core is easier to estimate with the results shown in FIG. 14. In this plot, the circulation was estimated at a location equal to six times the core radius (the isolated vortex models contain a fixed value of overall circulation strength inside the core). The values typically range from 50% in the case of a n=1 profile, up to 72% in the case of a Lamb-Oseen profile. The results measured indicate that the reference value obtained at $r=6r_c$ may underestimate the net circulation. Despite this, the present results suggest that the circulation values fall within the range defined by the two vortex models. Therefore, while the slotted tip acts to diffuse vorticity away from the tip vortex core, the net circulation about the vortex is essentially conserved.

Figure 15:
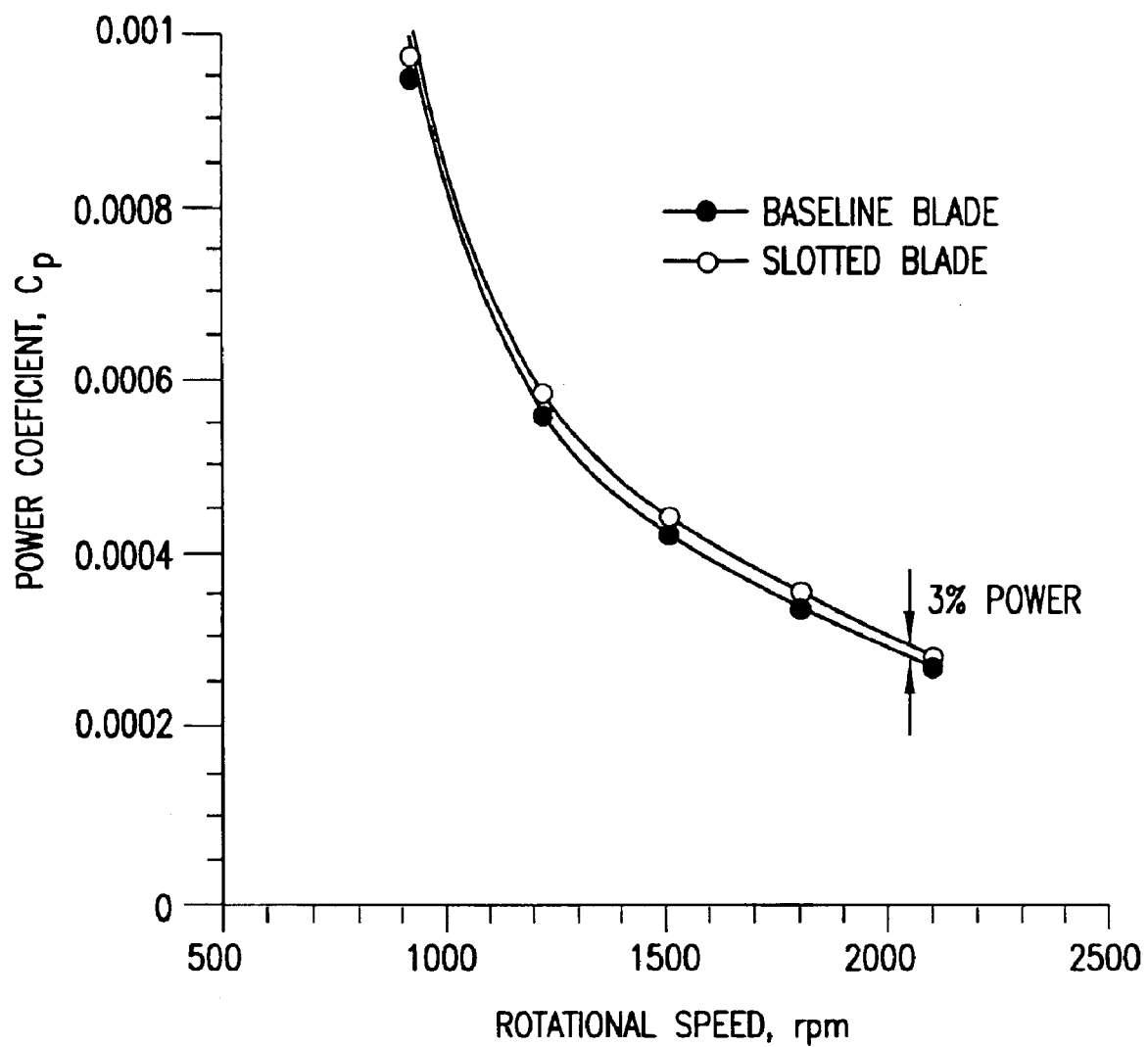

For the present slotted tip device, it is important to examine the power penalty associated with profile change compared to the baseline blade. For each blade, a direct power measurement was made, which is shown in FIG. 15 as a function of the rotational speed. It was found that the slotted tip blade produced a power penalty of less than 3% compared to the baseline blade, which is remarkably low compared to other proposed devices, such as sub-wings, spoilers, winglets, or boundary layer control devices.

The rotor blade with a slotted tip of the present invention modifies the characteristics of the strong vortex trailed from the blade tip. Forward facing slots direct a slight amount of the incident flow in the spanwise direction, which is vented at the side edge of the blade tip. This causes the tip vortex to detach from the blade tip face, and also introduces turbulent vortlets into the laminar core of the developing vortex. The resulting wake flow field was investigated using flow visualization and laser Doppler velocimetry. Measurements were conducted to quantify the vortex swirl velocity components, the viscous core development, and the overall vortical flow inside the vortex trails. The results were then compared to a baseline blade with a standard unmodified rectangular tip.

It has been found that the slotted blade reduced the tip peak value of the swirl velocity components in the tip vortex by up to 60% relative to those of the baseline blade. The core growth of the tip vortices from the slotted blade suggested a much higher rate of viscous diffusion, up to as much as three times that of the baseline case. Measurements of rotor power showed only a 3% increase relative to the baseline tip. Based on the overall results, the slotted blade is considered a highly effective design in diffusing vorticity and reducing the flow high field velocities that would otherwise be induced by a rotor tip vortex.

Although this invention has been described in connection with specific forms and embodiments thereof, it will be appreciated that various modifications other than those discussed above may be resorted to without departing from the spirit or scope of the invention as defined in the appended Claims. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A rotor blade system with reduced blade-vortex interaction noise, comprising:
   at least one rotor blade coupled at one end thereof to a central hub and extending radially therefrom and terminating in a rotor blade tip face at another end of said at least one rotor blade opposite to said one end thereof, said at least one rotor blade having spaced apart upper and lower surfaces, leading and trailing edge portions at respective opposing joined edges of said upper and lower surfaces, and an interior volume of said at least one rotor blade defined and enveloped by said upper and lower surfaces, said leading and trailing edges, and said rotor blade tip face; and
   at least one tube member embedded into said at least one rotor blade in proximity to said another end thereof, said at least one tube member having an inlet located above said leading edge, an outlet located at said rotor blade tip face, and a tube member length extending between said inlet and outlet within said interior volume of said at least one rotor blade, wherein said at least one tube member being positioned within said at least one rotor blade such that a portion of incident flow is directed from said leading edge through said at least one tube member and is ejected from said rotor blade tip face whereby a tip vortex is detached from said rotor blade tip face and turbulent vortlets are introduced within a laminar core of a developing vortex for dissolving said laminar core and reducing blade-vortex interaction noise, said inlet being shaped and positioned to maximize attenuation of flow velocities within the vortex core.

2. The rotor blade system of claim 1, including a plurality of tube members extending in a predetermined fashion within said interior volume of said at least one rotor blade, and wherein a plurality of inlets and outlets are formed respectively on said leading edge and said rotor blade tip face of said at least one rotor blade.

3. The rotor blade system of claim 2, comprising four said tube members.

4. The rotor blade system of claim 2, wherein the distance between said outlets is approximately 0.157 of the chord of said rotor blade tip, and wherein the diameter of each said tube member is approximately 0.067 of said chord.

5. The rotor blade system of claim 1, wherein said length of said at least one tube member is arcuately shaped.

6. The rotor blade system of claim 1, further comprising a plurality of rotor blades.

7. A method of reducing blade vortex interaction noise in a rotor blade system, comprising the steps of:

coupling at least one rotor blade at one end thereof to a central hub and extending said at least one rotor blade radially therefrom, said at least one rotor blade including:

a rotor blade tip face on another end of said at least one rotor blade opposedly to said one end thereof, spaced apart upper and lower surfaces, leading and trailing edge portions at respective opposing joined edges of said upper and lower surfaces, and an interior volume of said at least one rotor blade defined and enveloped by said upper and lower surfaces, said leading and trailing edges, and said rotor blade tip face; and embedding at least one tube member into said at least one rotor blade in proximity to said blade tip face, said at least one tube member having an inlet thereof positioned above said leading edge portion, an outlet thereof positioned at said rotor blade tip face, and a tube member length extending in arcuated fashion between said inlet and outlet within said interior volume of said at least one rotor blade, wherein said at least one tube member being positioned within said at least one rotor blade such that a portion of incident flow is directed from said leading edge through said at least one tube member and is ejected from said rotor blade tip face whereby a tip vortex is detached from said rotor blade tip face and turbulent vortlets are introduced within a laminar core of a developing vortex for dissolving said laminar core and reducing blade-vortex interaction noise, said inlet being shaped and positioned to maximize attenuation of flow velocities within the vortex core.

8. The method of claim 7, further comprising the steps of:

embedding into said at least one rotor blade a plurality of said tube members, forming an array of a plurality of said inlets at said leading edge position, and forming an array of a plurality of said outlets at said rotor blade tip.

* * * * *